United States Patent
Luo et al.

(10) Patent No.: US 9,544,776 B2
(45) Date of Patent: Jan. 10, 2017

(54) TRANSMISSION AND RECEPTION OF DEDICATED REFERENCE SIGNALS

(75) Inventors: Tao Luo, San Diego, CA (US); Juan Montojo, San Diego, CA (US); Peter Gaal, San Diego, CA (US); Sandip Sarkar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 785 days.

(21) Appl. No.: 12/409,963

(22) Filed: Mar. 24, 2009

(65) Prior Publication Data

US 2010/0062783 A1    Mar. 11, 2010

Related U.S. Application Data

(60) Provisional application No. 61/039,412, filed on Mar. 25, 2008.

(51) Int. Cl.
*H04W 16/02* (2009.01)
*H04J 11/00* (2006.01)
(Continued)

(52) U.S. Cl.
CPC .......... *H04W 16/02* (2013.01); *H04J 11/0069* (2013.01); *H04L 5/0007* (2013.01);
(Continued)

(58) Field of Classification Search
CPC ...... H04W 72/04; H04W 76/02; H04W 16/02; H04W 48/12; H04W 72/0406; H04L 5/0007; H04L 1/1854; H04L 5/0048; H04L 5/0053; H04B 7/0619; H04J 11/0069
(Continued)

(56) References Cited

U.S. PATENT DOCUMENTS 7,177,658 B2    2/2007 Willenegger et al.
2003/0198201 A1*   10/2003 Ylitalo et al. ............... 370/329
(Continued)

FOREIGN PATENT DOCUMENTS

AU    2009228295 A1    10/2009
CN    1929470 A    3/2007
(Continued)

OTHER PUBLICATIONS

"3rd . . . Generation Partnership Project; technical Specification Group Radio AccessV network; Evolved Universal Terrestrial Radio access (E-UTRA); Physical channels and Modulation (Release 8)" 3GPP TS 36.211 V8.2.0, [Online] Mar. 20, 2008 (Mar. 20, 2008), pp. 1-65, XP002537575. Retrieved from;the Internet: URL:http://www.3gpp.org/ftp/Specs/html-i nf o/36211.htm> [retrieved on Jul. 15, 2009] Sections 5.5 Reference Signals, 5.5.1 Generation of RS : p. 19, line 1-line 10 Sections 6.2, 6.2.1., 6.2.2 Slot structure ; and physical resource elements: p. 32, line!—p. 34, line 10 . Section 6.7.4 Mapping to resource elements p. 43, line 30-p. 44, line 7.
(Continued)

*Primary Examiner* — Matthew Sams
(74) *Attorney, Agent, or Firm* — Liem T. Do

(57) ABSTRACT

Providing a coding scheme for wireless communication downlink reference signals is described herein. By way of example, a dedicated reference signal is mapped to resources of a wireless channel as a function of an identifier (ID) of a cell in which the reference signal is transmitted. The function can be similar to mapping functions employed for common reference signals, or can be distinct from such functions. As one example of the latter, a dedicated reference signal mapping function can be shifted in time or frequency with respect to the common reference signal mapping function. By employing a mapping function based on cell ID,
(Continued)

noise caused by concurrent transmission of reference signals can be mitigated in a manner readily determined by terminals in a wireless network.

27 Claims, 16 Drawing Sheets

(51) Int. Cl.
*H04L 5/00* (2006.01)
*H04W 48/12* (2009.01)

(52) U.S. Cl.
CPC .......... *H04L 5/0048* (2013.01); *H04L 5/0058* (2013.01); *H04W 48/12* (2013.01)

(58) Field of Classification Search
USPC ........................................................ 455/450
See application file for complete search history.

(56) References Cited

U.S. PATENT DOCUMENTS

| | | | |
|---|---|---|---|
| 2004/0192218 A1* | 9/2004 | Oprea | 455/73 |
| 2005/0002467 A1* | 1/2005 | Seo et al. | 375/267 |
| 2005/0108610 A1 | 5/2005 | Kim et al. | |
| 2005/0111522 A1* | 5/2005 | Sung et al. | 375/145 |
| 2005/0169349 A1* | 8/2005 | Hwang et al. | 375/130 |
| 2005/0232216 A1* | 10/2005 | Webster et al. | 370/343 |
| 2005/0243940 A1* | 11/2005 | Huh et al. | 375/260 |
| 2007/0140106 A1* | 6/2007 | Tsai et al. | 370/208 |
| 2007/0153744 A1* | 7/2007 | Goldberg | 370/334 |
| 2007/0165584 A1* | 7/2007 | Ponnampalam et al. | 370/338 |
| 2007/0253465 A1 | 11/2007 | Muharemovic et al. | |
| 2008/0108363 A1* | 5/2008 | Yu et al. | 455/450 |
| 2008/0273452 A1 | 11/2008 | Khan et al. | |
| 2009/0016375 A1* | 1/2009 | Hsieh et al. | 370/465 |
| 2009/0041240 A1* | 2/2009 | Parkvall et al. | 380/247 |
| 2009/0274037 A1* | 11/2009 | Lee | H04L 1/1854 370/208 |
| 2010/0080160 A1* | 4/2010 | Kazmi et al. | 370/312 |
| 2010/0315963 A1* | 12/2010 | Jading et al. | 370/252 |

FOREIGN PATENT DOCUMENTS

| | | |
|---|---|---|
| EP | 1750409 A1 | 2/2007 |
| RU | 2307467 C2 | 9/2007 |
| TW | 200410575 | 6/2004 |
| WO | 2004017541 A1 | 2/2004 |

OTHER PUBLICATIONS

Alcatel-Lucent et al: "Dedicated Reference Signals for Precoding in E-UTRA Downlink" 3GPP Draft; R1-071718, 3rd Generation Partnership Project (3GPP), Mobile Competence Centre ; 650, Route Des Lucioles ; F-06921 Sophia-Antipolis Cedex ; France, vol. RAN WG1, no. St. Julian; Apr. 3, 2007, Apr. 3, 2007 (Apr. 3, 2007), XP050105640 [retrieved on Apr. 3, 2007].

Huawei: "Cell-specific integer sequences for frequency positioning of DL RS on subframe basis" 3G-PP Draft;. RI-070532, 3rd Generation Partnership Project (3GPP), Mobile Competence Centre ; 650, Route.Des Lucioles ; F-06921 Sophia-Antipolis Cedex ; France, v o l . RAN WG1, no. Sorrento, I t a l y; Jan. 15, 2007, Jan. 12, 2007 (Jan. 12, 2007), XP050104558 p. 1, line 1—p. 2, line 22 p. 4, line 1—p. 5, line 12.

International Search Report and Written Opinion—PCT/US2009/038268, International Search Authority—European Patent Office—Oct. 2, 2009.

Taiwan Search Report—TW98109762—TIPO—Dec. 20,2012.

* cited by examiner

TRANSMISSION AND RECEPTION OF DEDICATED REFERENCE SIGNALS

CLAIM OF PRIORITY UNDER 35 U.S.C. §119

The present Application for Patent claims priority to U.S. Provisional Application Ser. No. 61/039,412 entitled METHODS AND DEVICES FOR SENDING AND RECEIVING DEDICATED REFERENCE SIGNALS and filed Mar. 25, 2008, the entirety of which is expressly incorporated by reference herein.

BACKGROUND

I. Field

The following relates generally to wireless communication, and more specifically to coding and decoding dedicated reference signals for improved wireless communications.

II. Background

Wireless communication systems are widely deployed to provide various types of communication content and services such as, e.g., voice content, data content, video content, packet data services, broadcast services, messaging services, multimedia services, and so on. Typical wireless communication systems can be multiple-access systems capable of supporting communication with multiple users by sharing available system resources (e.g., bandwidth, transmit power). Examples of such multiple-access systems can include code division multiple access (CDMA) systems, time division multiple access (TDMA) systems, frequency division multiple access (FDMA) systems, orthogonal frequency division multiple access (OFDMA) systems, and the like.

Generally, wireless multiple-access communication systems can simultaneously support communication for multiple mobile devices. Each mobile device can communicate with one or more base stations via transmissions on forward and reverse links. The forward link (or downlink) refers to the communication link from base stations to mobile devices, and the reverse link (or uplink) refers to the communication link from mobile devices to base stations. Further, communications between mobile devices and base stations can be established via a single-in-single-out (SISO) system, a multiple-in-single-out (MISO) system, or a multiple-in-multiple-out (MIMO) system.

To facilitate wireless communications, a wireless base station can transmit a reference signal to terminals operating within a wireless communication system. The reference signal comprises coding sequences employed to randomize transmitted symbols, reducing noise and interference among concurrent transmissions in the wireless communication system. Furthermore, terminals can employ these reference signal sequences to decode the transmitted symbols. Thus, upon first entering the wireless system, a terminal will typically analyze received wireless signals to obtain reference signals that contain the coding/decoding information.

In modern wireless communication systems, a base station may transmit general reference signals for use by most or all terminals served by the base station, as well as dedicated reference signals for particular communication content, particular wireless services, or even specific sets of terminals or individual terminals. Additionally, where the base station has multiple antennas (e.g., a MIMO system or directional beamforming system), each antenna can employ a set of reference signals to serve a set of terminals. Thus, a single wireless service area can have concurrent transmission of many reference signals, from one or more sources.

To mitigate noise and interference between reference signals, coding sequences can be used to allocate reference signal symbols to distinct resources of a wireless channel. However, as a number of reference signals in a cell increases, a sufficient number of conventional codes may not exist to distinguish each reference. Additionally, mobile terminals operating in a system may require reference signal codes to be pre-programmed in software or firmware on the device. Accordingly, addition of new coding schemes in a system can prove restrictive for legacy terminals. Thus, it would be desirable for a reference signal coding scheme that mitigates at least the foregoing shortcomings.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to some aspects of the subject disclosure, provided is a coding scheme for wireless communication downlink reference signals that allows for scalability both in terms of reference signals and types of terminals supported. In at least one aspect, dedicated reference signals are mapped to resources of a wireless channel as a function of an identifier (ID) of a cell in which the reference signal is transmitted. The function can be similar to mapping functions employed for cell-specific reference signals, or can be distinct from such functions. As one example of the latter, a dedicated mapping function can be shifted in time or frequency with respect to the cell-specific mapping function. As a further example, a dedicated reference signal can include a user-equipment specific (UE-specific) reference signal, or a multicast-broadcast single frequency network (MBSFN) reference signal, or the like.

According to additional aspects of the subject disclosure, provided is a scalable coding architecture that can be applied to multi-antenna communication systems. Such systems can include multiple antennas located at a common base station, or sets of antennas located at separate base stations. Respective antennas of the multi-antenna system can employ a common virtual cell ID for reference signal coding. Accordingly, respective reference signal components can be coded in a like manner, depending on the virtual cell ID.

In at least one aspect of the subject disclosure, provided is a method of wireless communication. The method can comprise employing a data processor to generate a sequence for a dedicated reference signal. The method can additionally comprise employing the data processor to map the dedicated reference signal sequence to resources of a wireless channel as a function of an ID of a cell.

In other aspects, disclosed is an apparatus for wireless communications. The apparatus can comprise a data processor for executing a set of modules configured for providing reference signals in wireless communications. Specifically, the set of modules can comprise a calculation module that generates a sequence for a dedicated reference signal and a mapping module that allocates symbols of the dedicated reference signal to resource elements of a wireless channel as a function of a physical layer cell ID. Furthermore, the apparatus can comprise memory for storing the function or the physical layer cell ID.

Further aspects described herein provide an apparatus for wireless communications. The apparatus can comprise means for employing a data processor to generate a sequence for a dedicated reference signal. Moreover, the apparatus can comprise means for employing the data processor to map the dedicated reference signal sequence to resources of a wireless channel as a function of a cell ID.

According to additional aspects, provided is at least one processor configured for wireless communication. The processor(s) can comprise a module for generating a sequence for a dedicated reference signal. In addition, the processor(s) can comprise a module for mapping the dedicated reference signal sequence to resources of a wireless channel as a function of a cell ID.

In at least one other aspect, the subject disclosure provides a computer program product comprising a computer-readable medium. The computer-readable medium can comprise a first set of codes for causing a computer to generate a sequence for a dedicated reference signal. Moreover, the computer-readable medium can comprise a second set of codes for causing the computer to map the dedicated reference signal sequence to resources of a wireless channel as a function of a cell ID.

In at least one disclosed aspect, provided is a method for wireless communications. The method can comprise employing a data processor to analyze symbols of a received wireless signal. In addition, the method can comprise employing the data processor to identify an instruction within the analyzed signals pertaining to a dedicated reference signal. Furthermore, the method can comprise employing the data processor to decode the dedicated reference signal as a function of an ID of a cell transmitting the received wireless signal.

In other aspects, provided is an apparatus for wireless communications. The apparatus can comprise a wireless communication interface for receiving a wireless signal. Moreover, the apparatus can comprise a data processor for executing a set of modules configured for analyzing received wireless data. Specifically, the set of modules can include a parsing module that identifies an instruction within the received wireless signal pertaining to a dedicated reference signal and a demodulation module that decodes the dedicated reference signal as a function of an ID of a cell transmitting the received wireless signal.

In yet other aspects, the subject disclosure provides an apparatus for wireless communications. The apparatus can comprise means for employing a data processor to analyze symbols of a received wireless signal. Further, the apparatus can comprise means for employing the data processor to identify an instruction within the analyzed signals pertaining to a dedicated reference signal. In addition to the foregoing, the apparatus can comprise means for employing the data processor to decode the dedicated reference signal as a function of an ID of a cell transmitting the received wireless signal.

In one or more additional aspects, disclosed is at least one processor configured for wireless communication. The processor(s) can comprise a module for employing a data processor to analyze symbols of a received wireless signal. The processor(s) can further comprise a module for employing the data processor to identify an instruction within the analyzed signals pertaining to a dedicated reference signal. Additionally, the processor(s) can comprise a module for employing the data processor to decode the dedicated reference signal as a function of an ID of a cell transmitting the received wireless signal.

According to another aspect, the subject disclosure provides a computer program product comprising a computer-readable medium. The computer-readable medium can comprise a first set of codes for causing a computer to employ a data processor to analyze symbols of a received wireless signal. Furthermore, the computer-readable medium can comprise a second set of codes for causing the computer to employ the data processor to identify an instruction within the analyzed signals pertaining to a dedicated reference signal. Moreover, the computer-readable medium can comprise a third set of codes for causing the computer to employ the data processor to decode the dedicated reference signal as a function of an ID of a cell transmitting the received wireless signal.

According to one or more other aspects provided herein, disclosed is a method employed in wireless communications. The method can comprise employing a data processor to generate a set of common reference signal resource elements comprising a number of common resource signal elements. The method can also comprise employing the data processor to generate a set of dedicated reference signal resource elements comprising a number of dedicated resource signal elements, wherein the number of common resource signal elements is different from the number of dedicated resource signal elements.

In one or more additional aspects, disclosed is an apparatus employed in wireless communications. The apparatus can comprise a data processor for executing instructions to facilitate wireless communications. Specifically, the instructions can cause the data processor to generate a set of common reference signal resource elements comprising a number of common resource signal elements. Further, the instructions can cause the data processor to generate a set of dedicated reference signal resource elements comprising a number of dedicated resource signal elements, wherein the number of common resource signal elements is different from the number of dedicated resource signal elements. Further to the above, the apparatus can comprise memory for storing the instructions.

In other disclosed aspects, provided is an apparatus employed in wireless communications. The apparatus can comprise means for employing a data processor to generate a set of common reference signal resource elements comprising a number of common resource signal elements. Furthermore, the apparatus can comprise means for employing the data processor to generate a set of dedicated reference signal resource elements comprising a number of dedicated resource signal elements, wherein the number of common resource signal elements is different from the number of dedicated resource signal elements.

According to further aspects, provided is at least one processor configured for wireless communications. The processor(s) can comprise a module for employing a data processor to generate a set of common reference signal resource elements comprising a number of common resource signal elements. Furthermore, the processor(s) can comprise a module for employing the data processor to generate a set of dedicated reference signal resource elements comprising a number of dedicated resource signal elements, wherein the number of common resource signal elements is different from the number of dedicated resource signal elements.

In at least one other aspect, the subject disclosure provides a computer program product comprising a computer-readable medium. The computer-readable medium can comprise a first set of codes for causing a computer to employ a data processor to generate a set of common reference signal resource elements comprising a number of common resource signal elements. The computer-readable medium can also comprise a second set of codes for causing the computer to employ the data processor to generate a set of dedicated reference signal resource elements comprising a number of dedicated resource signal elements, wherein the number of common resource signal elements is different from the number of dedicated resource signal elements.

To the accomplishment of the foregoing and related ends, the one or more aspects comprise the features hereinafter fully described and particularly pointed out in the claims. The following description and the annexed drawings set forth in detail certain illustrative aspects of the one or more aspects. These aspects are indicative, however, of but a few of the various ways in which the principles of various aspects can be employed and the described aspects are intended to include all such aspects and their equivalents.

DETAILED DESCRIPTION

Figure 1:
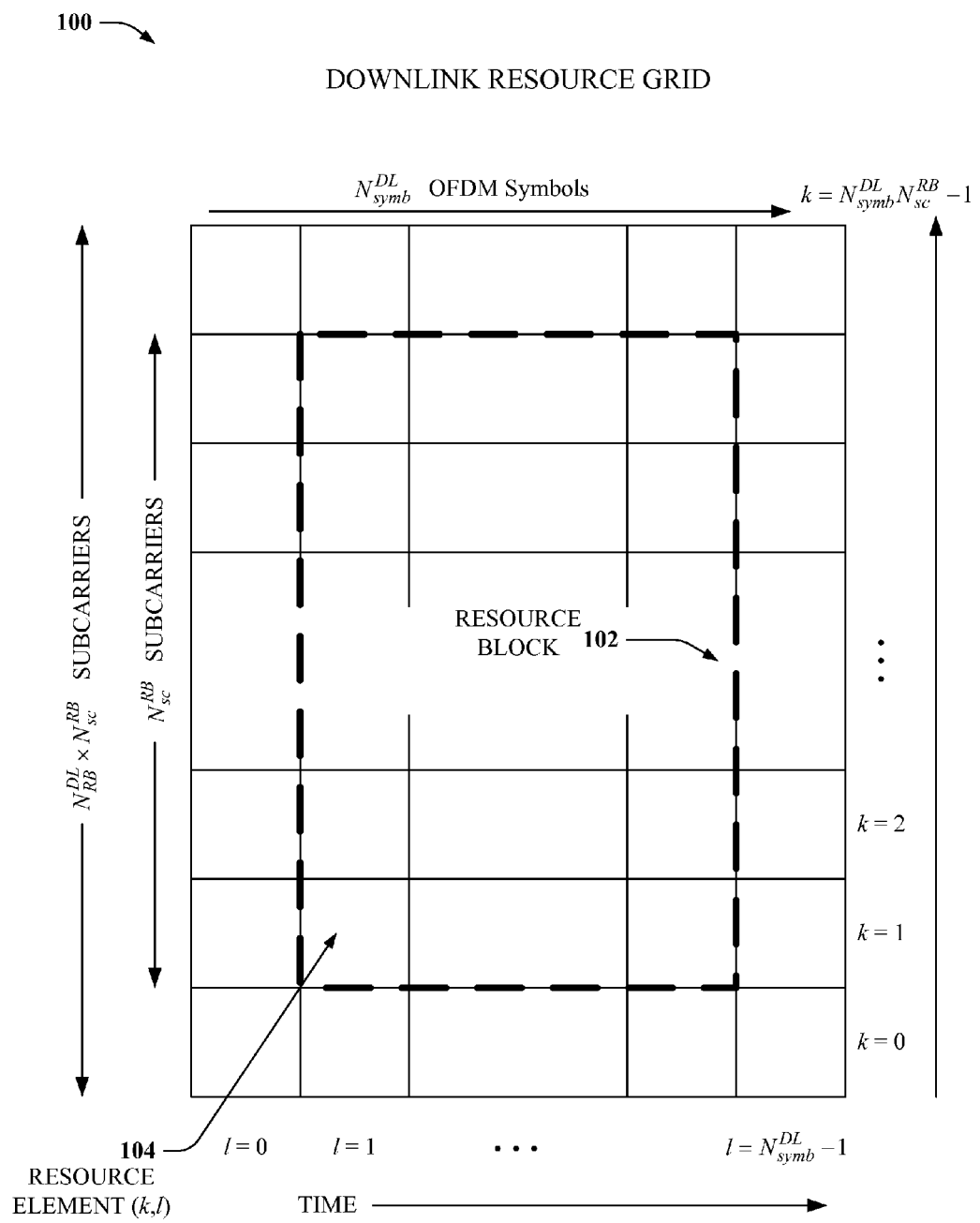
FIG. 1 illustrates a block diagram of an example downlink resource grid for an orthogonal frequency division multiplex system in accord with disclosed aspects.

Various aspects are now described with reference to the drawings, wherein like reference numerals are used to refer to like elements throughout. In the following description, for purposes of explanation, numerous specific details are set forth in order to provide a thorough understanding of one or more aspects. It can be evident, however, that such aspect(s) can be practiced without these specific details. In other instances, well-known structures and devices are shown in block diagram form in order to facilitate describing one or more aspects.

In addition, various aspects of the disclosure are described below. It should be apparent that the teaching herein can be embodied in a wide variety of forms and that any specific structure and/or function disclosed herein is merely representative. Based on the teachings herein one skilled in the art should appreciate that an aspect disclosed herein can be implemented independently of any other aspects and that two or more of these aspects can be combined in various ways. For example, an apparatus can be implemented and/or a method practiced using any number of the aspects set forth herein. In addition, an apparatus can be implemented and/or a method practiced using other structure and/or functionality in addition to or other than one or more of the aspects set forth herein. As an example, many of the methods, devices, systems and apparatuses described herein are described in the context of providing cell-specific signal coding for reference signals in a wireless communication environment. One skilled in the art should appreciate that similar techniques could apply to other communication environments.

Wireless communication systems implement information exchange between wireless nodes by employing various signaling mechanisms. In one instance, a base station can be employed to transmit pilot signals that establish timing sequences and identify signal source and network associated with the source, among other things. A remote wireless node, such as a user terminal (UT) or user equipment (UE), can decode a pilot signal to obtain information necessary to establish basic communication with the base station. As one particular example, the UE can decode the pilot signal to obtain an identifier for a wireless communication cell in which the base station resides (e.g., according to a wireless network deployment).

One significant problem in such a system is interference, or wireless noise, between wireless transmissions of nearby wireless nodes. Interference can reduce reception quality, retard throughput, or render communication ineffective when severe. Accordingly, planned base station deployments are ideal in that wireless nodes can be placed at a suitable distance to mitigate interference. However, even in planned networks downlink interference can result, for instance when traffic load becomes large, when terminals are at an edge of a service area, or the like. Furthermore, in multi-antenna communication systems (e.g., multiple-in-multiple-out [MIMO] systems), interference problems can be exacerbated by concurrent transmission of multiple signal elements by distinct antennas.

To mitigate overlapping transmissions and resulting signal interference, wireless communications are typically structured in time, frequency, or on various code or symbol resources, to enable signals to be distinguished from other signals. For instance, transmitting at different times enables distinction, as well as transmitting on orthogonal frequencies. Furthermore, employing orthogonal codes or symbols can also yield mitigated interference, even for signals transmitted at a common point in time. In such a manner, wireless resources can be segmented to enable multiple nodes to operate in a given wireless environment.

For reference signals, low signal interference is important because such signals convey information required to decode data pertaining to other wireless services provided by a network. For instance, a reference signal can comprise demodulation sequences employed in decoding signaling data, multimedia data, and so on. Accordingly, reliable reception of reference signals is a desired aspect of wireless communication systems.

To mitigate noise and interference for reference signals, wireless networks employ coding sequences to randomize cross-signal noise. The coding sequences can map reference signal symbols to distinct timeslots of a wireless channel, or orthogonal frequencies of the wireless channel, to mitigate interference between concurrent wireless transmissions of multiple antennas. To provide scalable coding for reference signals, the subject disclosure relates to reference signal coding based on a cell ID (or, e.g., a sector ID) of a transmitting cell (or sector) of a wireless network. The cell ID provides a systematic mechanism for randomizing noise among reference signals of various cells. Furthermore, because the cell ID is typically conveyed in pilot or synchronization signals, terminals typically have ready access to the cell ID for signal decoding purposes.

The subject disclosure pertains primarily to two types of reference signals, common reference signals and dedicated reference signals. As utilized in the written description and appended claims, common reference signals are signals transmitted for generic use by wireless terminals in a cell of a wireless network. Common reference signals can also be referred to as cell-specific reference signals. Dedicated reference signals, on the other hand, are signals transmitted for particular use within the cell. Examples can include use for a particular wireless service or content (e.g., multicast/broadcast single frequency network [MBSFN] service) or to serve a particular UE or set of UEs. Dedicated reference signals for a particular UE or set of UEs are also referred to herein and in the appended claims as UE-specific reference signals. Dedicated reference signals for MBSFN services are also referred to in the description and claims as cell-specific MBSFN reference signals.

Resource mapping for a common or dedicated reference signal is dependent at least in part on an ID of a cell in which the reference signal(s) is transmitted. As an illustrative example, the resource mapping can specify location of a reference signal symbol within a frequency band, or within a timeslot, set of code division multiple access (CMDA) codes, set of orthogonal frequency division multiplex (OFDM) symbols, or the like, as a function of the cell ID. Additionally, within a particular cell, mapping of different reference signals, such as common reference signals, UE-specific reference signals or MBSFN reference signals, can have like mapping or distinct mapping. In other words, a common function of cell ID can be utilized to map reference signal symbols to channel resources, or different functions of cell ID can be employed to map different reference signals.

Cell-specific reference signals can typically be transmitted in most or all downlink subframes in a cell supporting non-MBSFN transmission. For a subframe transmitting MBSFN services, a subset of OFDM symbols included in the subframe can be used for transmission of the cell-specific reference symbols. For instance, cell-specific reference signals can be limited to the first two OFDM symbols of a MBSFN subframe. However, the subject disclosure and appended claims are not so limited. Additionally, cell-specific reference signals can be transmitted on one or several antenna ports coupled with a wireless base station. For instance, one or both antenna ports of a dual-port system can be employed for cell-specific reference signals; one, two or four ports of a quad-port system can be employed for such signals, and so on.

Referring now to the Figures, FIG. 1 illustrates a block diagram of an example wireless channel resource layout 100 for a frequency division duplex (FDD) third generation partnership project (3GPP) long term evolution (LTE) system; however it should be appreciated that the subject disclosure and appended claims are not limited to this specific example. Wireless channel resource layout 100 comprises resource blocks (RB) 102 utilized to describe a mapping of physical channels to wireless channel resource elements 104. Physical and virtual resource blocks (102) are defined for the mapping. A physical resource block 102 is defined as $N_{symb}^{DL}$ consecutive OFDM symbols in a time domain, and $N_{sc}^{RB}$ consecutive subcarriers in a frequency domain. Various numbers of consecutive OFDM symbols and consecutive frequency subcarriers can be employed for the physical resource block 102. For example, in an LTE system with normal cyclic prefix and $\Delta f=15$ kilohertz (kHz), the number of OFDM symbols per resource block (102) can be seven, and the number of frequency subcarriers per resource block (102) can be 12. See, e.g., 3GPP TS 36.211 version 850, expressly incorporated herein by reference in its entirety, at section 6.2.3 for additional examples of LTE resource block configurations.

Reference signal sequences can be generated according to various suitable sequence generation algorithms, including sequence algorithms employed in LTE systems, wideband CDMA (W-CDMA) systems, or other wireless communication systems. In some systems, generation of a two-dimensional reference signal sequence $r_{m,n}(n_s)$, where $n_s$ is a slot number within a radio frame, can depend on a cyclic prefix utilized for the sequence. As one example, for a normal cyclic prefix, $r_{m,n}(n_s)$ can be generated as a symbol-by-symbol product $r_{m,n}(n_s)=r_{m,n}^{OS} \cdot r_{m,n}^{PRS}(n_s)$ of a two-dimensional orthogonal sequence $r_{m,n}^{OS}$ and a two-dimensional pseudo-random sequence $r_{m,n}^{PRS}(n_s)$. In such case, there are $N_{OS}=3$ different two-dimensional orthogonal sequences and NPRS=168 different two-dimensional pseudo-random sequences. For a sequence as described above, a one-to-one mapping can be provided between three identities within a physical-layer cell identity group and three two-dimensional orthogonal sequences. Specifically, the orthogonal sequence number $n \in \{0,1,2\}$ can be correlated to an ID $N_{ID}^{(2)}$ within the physical-layer cell identity group.

In the above example, the two-dimensional orthogonal sequence is generated according to the following formula:

$$r_{m,n}^{OS}=s_{m,n}, n=0,1 \text{ and } m=0,1,\ldots,219$$

where $s_{m,n}$ is a symbol at the $m^{th}$ row and the $n^{th}$ column of the following matrix:

$$S_i^T = \underbrace{[\bar{S}_i^T \ \bar{S}_i^T \ \cdots \ \bar{S}_i^T]}_{74 \text{ entries}},$$

$$i = 0,1,2$$

and where:

$$\bar{S}_0 = \begin{bmatrix} 1 & 1 \\ 1 & 1 \\ 1 & 1 \end{bmatrix},$$

-continued $$\overline{S}_1 = \begin{bmatrix} 1 & e^{j4\pi/3} \\ e^{j2\pi/3} & 1 \\ e^{j4\pi/3} & e^{j2\pi/3} \end{bmatrix},$$

$$\overline{S}_2 = \begin{bmatrix} 1 & e^{j2\pi/3} \\ e^{j4\pi/3} & 1 \\ e^{j2\pi/3} & e^{j4\pi/3} \end{bmatrix}$$

for orthogonal sequence 0, 1 and 2, respectively. The orthogonal sequence number i is given by $N_{ID}^{(2)}$. The two-dimensional binary pseudo-random sequence $r_{m,n}^{PRS}$ ($n_s$) can be given by various suitable pseudo-random sequences. One example can include a length-31 Gold sequence c(i) (e.g., see 3GPP TS 36.211 version 8.50 at section 7.2).

To continue the above example for an extended cyclic prefix case, $r_{m,n}(n_s)$ can be generated from the two-dimensional pseudo-random sequence $r_{m,n}^{PRS}(n_s)$ as discussed above. In this case, a one-to-one mapping can be provided between the physical-layer cell identity and the $N_{PRS}$=504 different two-dimensional pseudo-random sequences. In some aspects of the subject disclosure, different sequences can be employed for generating different types of reference signals. As one illustrative example, cell-specific reference signals can be generated with a first sequencing algorithm, cell-specific MBSFN reference signals can be generated with a second sequencing algorithm, or UE-specific reference signals can be generated with a third sequencing algorithm, or some suitable combination thereof.

Reference signals are coded in order to provide noise randomization for concurrent transmission of multiple signals. Coding can comprise application of a mapping function, utilized to allocate reference sequence symbols (e.g., generated by one or more of the above algorithms) to resources of a wireless channel. In at least some aspects of the subject disclosure, a mapping function can be based at least in part on a cell ID of a cell transmitting the reference signal. According to other aspects, at least one of a common reference signal or a dedicated reference signal is generated with a cell-specific mapping function.

One example of a mapping function dependent on cell-ID can include the following. A two-dimensional reference signal sequence $r_{m,n}(n_s)$ is mapped to complex-valued modulation symbols $a_{k,l}^{(p)}$ utilized as reference symbols for a given antenna port p in a given slot $n_s$ according to the following relation:

$$a_{k,l}^{(p)} = r_{m',n}(n_s)$$

where $$k = 6m + (v + v_{shift}) \bmod 6$$

$$l = \begin{cases} 0 & \text{if } n = 0 \text{ and } p \in \{0, 1\} \\ 1 & \text{if } n = 0 \text{ and } p \in \{2, 3\} \\ N_{symb}^{DL} - 3 & \text{if } n = 1 \text{ and } p \in \{0, 1\} \\ N_{symb}^{DL} - 2 & \text{if } n = 1 \text{ and } p \in \{2, 3\} \end{cases}$$

and $$m = 0, 1, \ldots, 2 \cdot N_{RB}^{DL} - 1$$

$$m' = m + 110 - N_{RB}^{DL}$$

$$n = \begin{cases} 0, 1 & \text{if } p \in \{0, 1\} \\ 0 & \text{if } p \in \{2, 3\} \end{cases}$$

Variables v and $v_{shift}$ define a position in the frequency domain (e.g., a subcarrier) for different reference signal symbols, where v is given by:

$$v = \begin{cases} 3n & \text{if } p = 0 \\ 3 + 3n & \text{if } p = 1 \\ 3(n_s \bmod 2) & \text{if } p = 2 \\ 3 + 3(n_s \bmod 2) & \text{if } p = 3 \end{cases}$$

The shift in frequency $v_{shift}$ is derived from the physical-layer cell ID. Accordingly, in the above example, the mapping function allocates reference signal symbols to a frequency subcarrier based at least in part on the physical-layer cell ID. Various suitable relationships between resource allocation and cell ID can be employed for mapping reference signal symbols to channel resources. For instance, $v_{shift}$ could be directly associated with a cell ID number $\{0, 1, \ldots, n\}$ in a system with n antenna ports. As another example, $v_{shift} = N_{ID}^{cell} \bmod 6$, or $v_{shift} = N_{ID}^{cell} \bmod 3$ or some other suitable relationship between $v_{shift}$ and cell ID can be employed. Furthermore, it should be appreciated that a suitable mapping function can allocate reference signal symbols to time, symbol or code resources of a wireless channel, in addition to or in lieu of frequency, as a function of cell ID. Furthermore, the foregoing mapping function is only one example for illustrative purposes; the subject disclosure and appended claims are not so limited.

Figure 2:
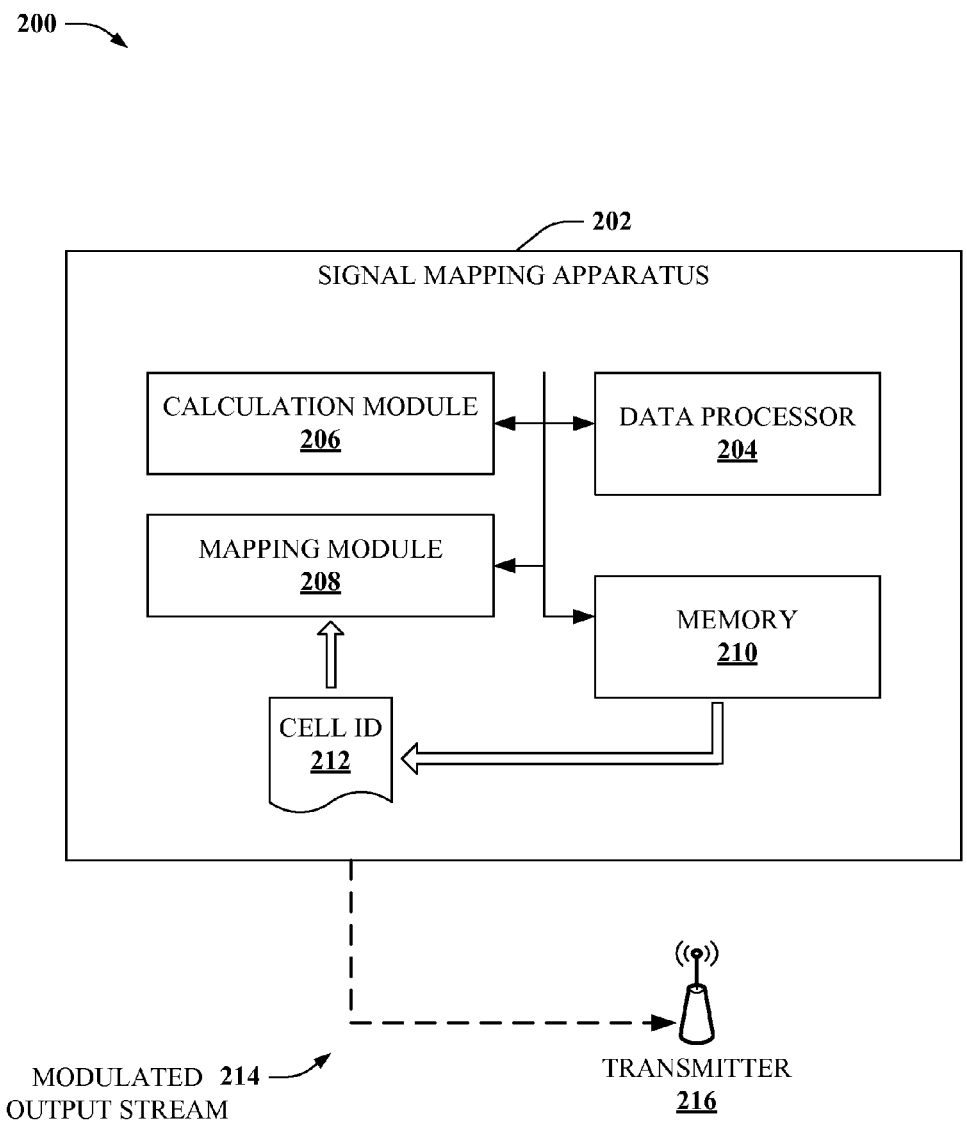
FIG. 2 depicts a block diagram of a sample system providing noise reduction for wireless reference signals according to other disclosed aspects.

Referring now to the figures, FIG. 2 illustrates a block diagram of an example system 200 for facilitating wireless communications according to aspects of the subject disclosure. System 200 can, for instance, generate one or more reference signals for transmission by one or more transmitters 216. The references signal(s) can comprise a common reference signal (e.g., cell-specific reference signal) or a dedicated reference signal (e.g., a cell-specific MBSFN reference signal, a UE-specific reference signal), or a suitable combination thereof. Reference signals can be scrambled or coded by system 200 to reduce noise caused by concurrent transmissions by multiple transmitters (216). Additionally, according to at least some aspects of the subject disclosure, the scrambled/coded sequence can be mapped to resources of a wireless channel at least in part based on a cell ID of transmitter 216.

Specifically, system 200 can comprise a signal mapping apparatus 202 that can generate reference signals for transmitter 216 and map the generated reference signals to downlink resources employed by transmitter 216. The reference signals can comprise cell-specific reference signals, cell-specific MBSFN reference signals, or UE-specific reference signals. Reference signals are output from signal mapping apparatus 202 as a modulated output stream 212.

Signal mapping apparatus 202 can comprise a data processor 204 for executing a set of modules (206, 208) configured for signal generation and resource mapping. For instance, a calculation module 206 can be executed by data processor 204 to generate a sequence for a reference signal. The sequence can be for a common reference signal or a dedicated reference signal. Alternatively, the sequence can be employed for both common and dedicated reference signals, or multiple distinct sequences can be generated for the common and dedicated reference signals, respectively.

The calculation module 206 can output generated signals, comprising a stream of reference symbols, to a mapping module 208. Mapping module 208 employs a cell ID 212 associated with transmitter 216 for allocating reference symbols to particular downlink wireless channel resources. It should be appreciated that selection of a channel resource for a particular symbol is based at least in part on the cell ID. Moreover, allocation can comprise selecting orthogonal frequency subcarriers, different time subframes, timeslots, CDMA codes or OFDM symbols, to randomize noise for the mapped signal. Specifically, the allocation can employ a function of the cell ID specifying orthogonal frequency, code or symbol resources, or different timeslots, based on the cell ID 212. Accordingly, noise or interference between reference signals of transmitter 216 and reference signals transmitted by other transmitters (not depicted) having a different cell ID from cell ID 212 can be reduced.

In some aspects of the subject disclosure, calculation module 206 can be configured to generate a set of reference signal sequences for a set of antenna ports of transmitter 216. The set of reference signals can further be allocated to different subframes of a wireless channel by mapping module 208. In at least one aspect of the subject disclosure, common reference signals and dedicated reference signals can be allocated to different subframes of a wireless channel. Specifically, the common reference signals can be allocated to one subset of subframes allocated to a first subset of antenna ports of transmitter 216, and dedicated reference signals can be allocated to another subset of subframes allocated to a second subset of antenna ports. In other aspects, common and dedicated reference signals can be allocated to identical antenna port subframes. In the latter case, common reference signals and dedicated reference signals can optionally be allocated to different symbols of an antenna port subframe(s). For instance, common reference signals can be allocated to the first two OFDM symbols of subframes comprising dedicated reference signals, which are allocated to OFDM symbols other than the first two. It should be appreciated that the subject disclosure and appended claims are not limited to the foregoing example aspects, however.

Cell ID 212 employed by mapping module 208 can be stored in memory 210 of signal mapping apparatus 202. Additionally, reference signals generated by calculation module 206 or a mapping between such reference signals and wireless channel resources can also be stored in memory 210. Once a reference signal is mapped to channel resources, a resulting modulated output stream 214 is provided to transmitter 216 for downlink transmission to one or more terminals (not depicted) served by transmitter 216. Specifically, common reference signals can be broadcast by transmitter 216 on wireless broadcast channels. Additionally, dedicated reference signals can be broadcast on dedicated channels (e.g., a MBSFN reference signal can be broadcast on a MBSFN channel) and UE-specific reference signals can be unicast on specific channels allocated to a UE or set of UEs.

As described, system 200 can provide reduced noise in wireless communications. Typically, transmitter 216 will broadcast the cell ID 212 on pilot or synchronization channels analyzed by terminals within a cell served by transmitter 216. Thus, the cell ID 212 is readily available to those terminals. Additionally, by employing cell ID 212 in mapping reference signals to a wireless channel, a systematic mechanism is provided for terminals to decode reference signals, based on the cell ID 212.

Figure 3:
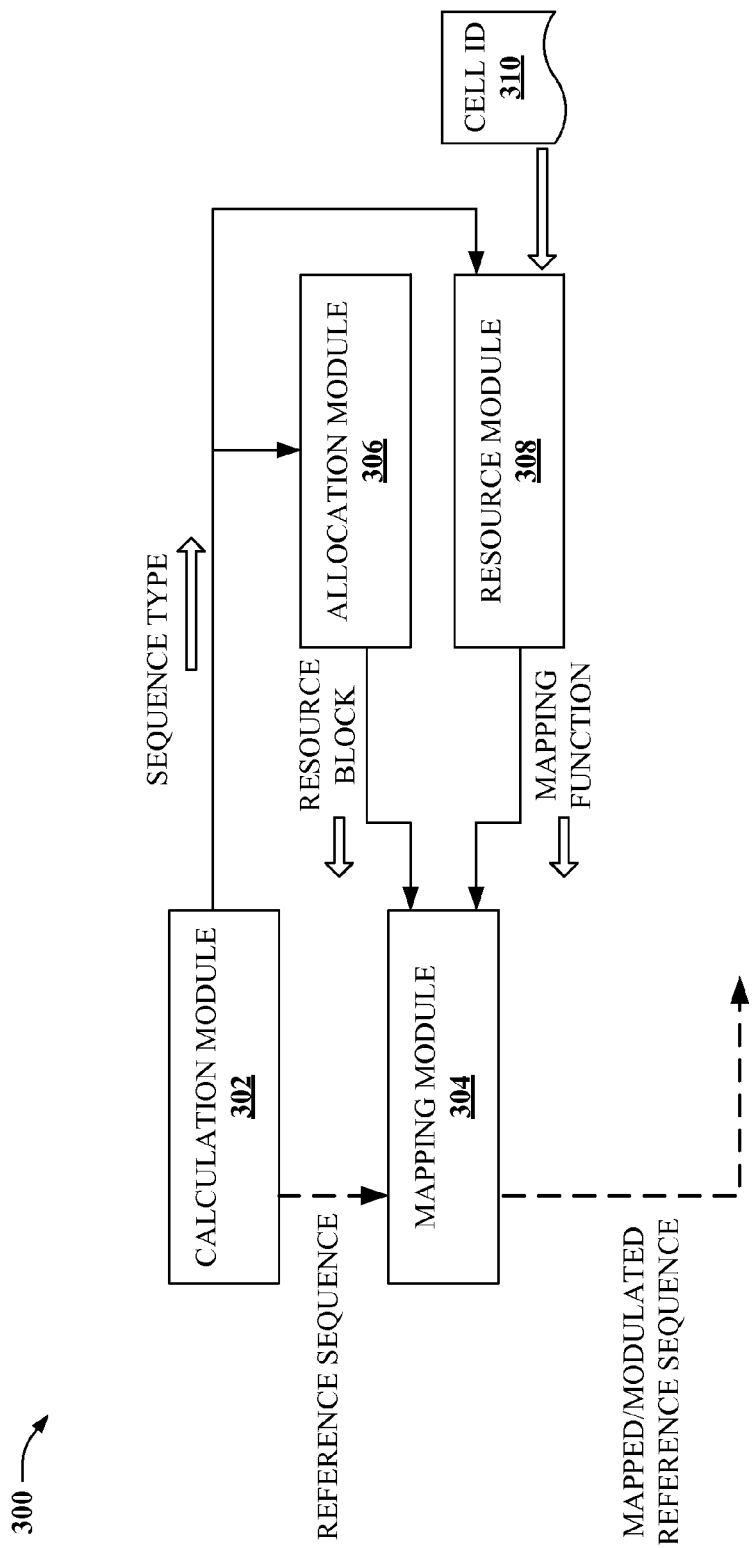
FIG. 3 depicts a block diagram of an example system for mapping dedicated wireless reference signals to wireless resources according to other aspects.

FIG. 3 illustrates a block diagram of a sample system 300 for mapping reference signals to wireless communication channels in a wireless environment. System 300 can be included as part of signal mapping apparatus 202 of FIG. 2, for instance. Accordingly, system 300 can be employed for noise reduction for concurrent reference signal transmissions, as described herein.

System 300 can comprise a calculation module 302 for generating symbols for common or dedicated reference signals. The resulting signals are provided to mapping module 304. Additionally, a type of respective signal (e.g., cell-specific, cell-specific MBSFN, UE-specific) can be provided to an allocation module 306 or to a resource module 308, or both.

Allocation module 306 is configured to select a resource block of a wireless channel depending on a type of signal to be transmitted on the resource block. According to some aspects of the subject disclosure, the selection can also depend on an antenna port assigned to a particular reference signal. Thus, for instance, if common reference signals are transmitted on ports 0 or 1 of a four port system, allocation module 306 can select a resource block associated with port 0 or 1 for common reference signals, and a resource block associated with port 2 or 3 for dedicated reference signals. Alternatively, selection of resource block can be independent of antenna port, and based on signal type instead.

System 300 can further comprise a resource module 308 configured to select a function of a cell ID 310 transmitting a particular reference signal. In some aspects, the resource module 308 can select different functions of the cell ID 310 for different types of reference signals. For instance, a function allocating reference signal symbols to channel resources based on a physical-layer cell ID $N_{ID}^{(p)}$ can be selected (e.g., cell ID 310), where $N_{ID}^{(p)}$ is a set of IDs (e.g., $N_{ID}^{(p)} \in \{0, 1, 2, \ldots, p\}$) associated with a particular antenna port p. As another example, allocation of reference signal symbols can be based at least in part on $N_{ID}^{cell}$ mod 6, $N_{ID}^{cell}$ mod 3, where $N_{ID}$ is a distinct identifier for a set of cells, or some other suitable function of cell ID 310. In other aspects of the subject disclosure, resource module 308 can select a function of cell ID 310 for allocating reference signal symbols to channel resources, independent of a type of such reference signal. A mapping function selected by resource module 308 is provided to mapping module 304.

Mapping module 304 employs a resource block provided by allocation module 306 and a mapping function specified by resource module 308 in allocating reference signal symbols to downlink channel resources. As such, the resource allocation can depend on type of reference signal mapped, or antenna port transmitting the signal, depending on configurations of allocation module 306 and resource module 308 as discussed above. Additionally, the allocation can depend on the cell ID 310. Mapping module 304 outputs a mapped/modulated reference sequence for transmission by a transmitter (not depicted, but see transmitter 216 of FIG. 2, supra). System 300 can output a mapped/modulated reference sequence for each downlink time frame transmitted, or as otherwise required for downlink transmissions. In some aspects, system 300 can store mapped/modulated reference sequences in memory (not depicted) once generated, to alleviate redundant signal processing.

Figure 4:
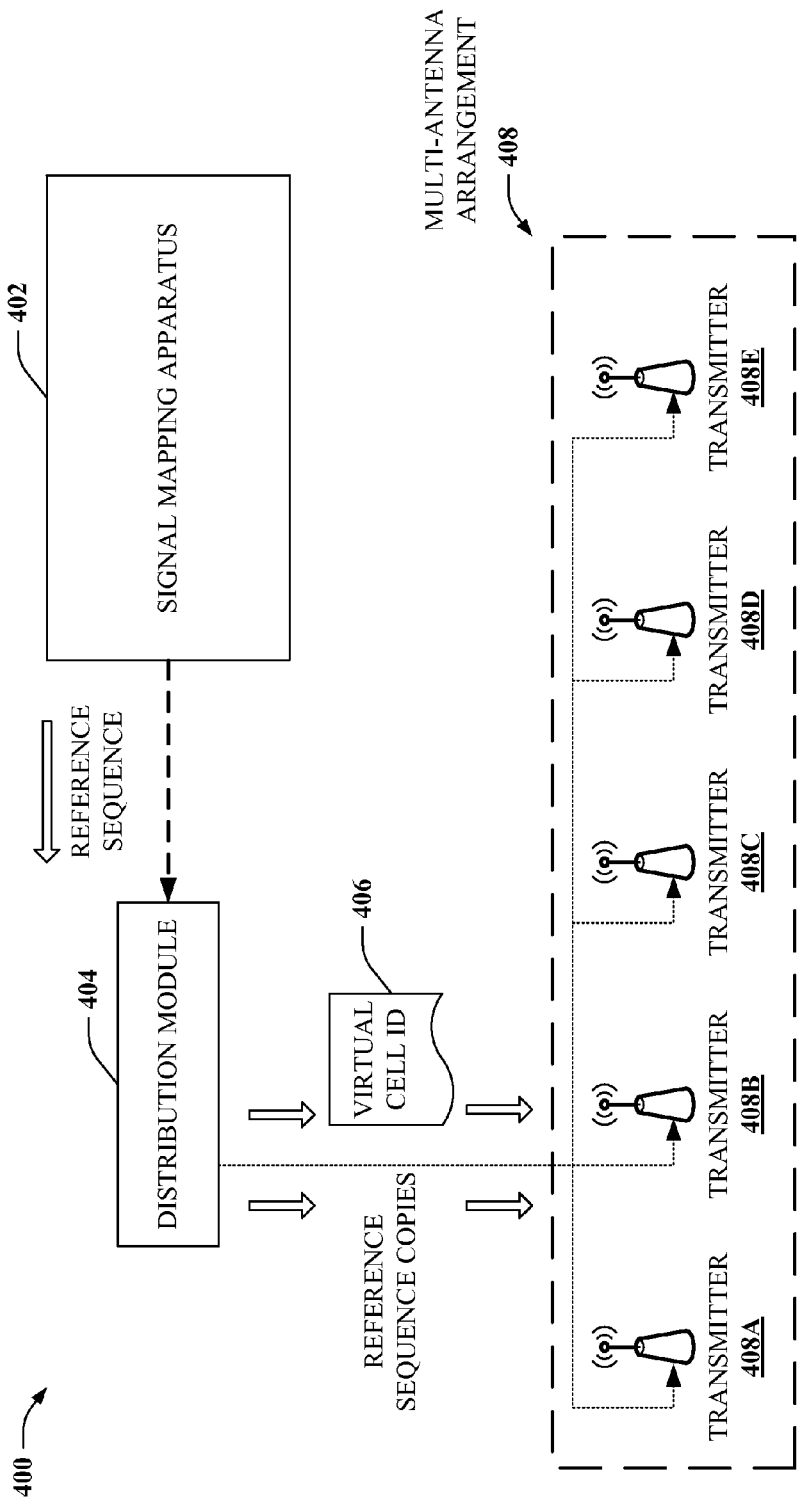
FIG. 4 depicts a block diagram of a sample system for providing reference signal resource mapping in multi-antenna communications.

FIG. 4 illustrates a block diagram of an example system 400 for providing cell-specific reference signals in multi-antenna communications according to further aspects of the subject disclosure. System 400 can comprise a signal mapping apparatus 402 for generating reference signal sequences, as described herein. Such sequences can include symbol sequences for common reference signals or dedicated reference signals. Particularly, the reference signals are generated for concurrent transmission by multiple antennas of a multi-antenna arrangement 408.

Signal mapping apparatus 402 can output a reference sequence for multi-antenna communication to a distribution module 404. Distribution module 404 can be configured to generate copies of the reference sequence. At least one copy per antenna 408A, 408B, 408C, 408D, 408E (408A-408E) of the multi-antenna arrangement participating in the multi-antenna communication is generated by distribution module 404. Copies of the reference sequence are then sent to respective antennas (408A-408E) assigned to transmit a component of the multi-antenna communication.

In addition, distribution module 404 can submit a virtual cell ID 406 with the reference sequence copies to the respective antennas (408A-408E). The virtual cell ID 406 is a distinct ID allocated to the multi-antenna arrangement 408, irrespective of physical-layer cell IDs associated with respective antennas 408A-408E of the arrangement 408. Thus, for instance, transmitter 408A can have a cell ID distinct from other antennas 408B-408E of the arrangement 408, as well as being associated with the virtual cell ID 406. The virtual cell ID 406 therefore identifies the arrangement of antennas 408, rather than individual antennas 408A-408E.

In at least one aspect of the subject disclosure, subsets of the multi-antenna arrangement 408 can be associated with a separate virtual cell ID (406), distinct from virtual cell ID 406 allocated to all antennas of the arrangement 408, and also distinct from respective physical-layer cell IDs of the respective antennas 408A-408E. Thus, as an example, a subset of antennas comprising transmitter 408A and transmitter 408B can have a virtual cell ID (406) distinguishing this antenna subset 408A, 408B from other suitable antenna subsets of the arrangement 408, distinguishing the subset 408A, 408B from the arrangement 408 as a whole, and also distinguishing the subset 408A, 408B from the respective antennas 408A and 408B comprising the subset. Accordingly, different subsets of the set of antennas 408A-408E can be associated with one or more subset virtual cell IDs, as well as virtual cell ID 406 identifying the arrangement 408, in addition to a physical-layer cell ID identifying an individual antenna (408A-408E).

The multi-antenna arrangement 408 can comprise antennas employed in various types of multi-antenna communication, including MISO communication, SIMO communication or MIMO communication, or the like. Upon receiving a copy of a reference signal and a virtual cell ID 406 (or, e.g., a suitable subset virtual cell ID), an antenna 408A-408E can map the reference signal copy to resources of a wireless channel. As described herein, the mapping can be dependent on the virtual cell ID 406, such that each antenna of multi-antenna arrangement 408 transmitting a component signal of a multi-antenna communication signal has the same reference signal—resource mapping. Accordingly, a terminal receiving the component signals can identify such components as part of a common multi-antenna communication, based on the common resource mapping. In such a manner, the randomization and decoding benefits provided by cell ID-based resource mapping can be employed in conjunction with multi-antenna communication.

Figure 5:
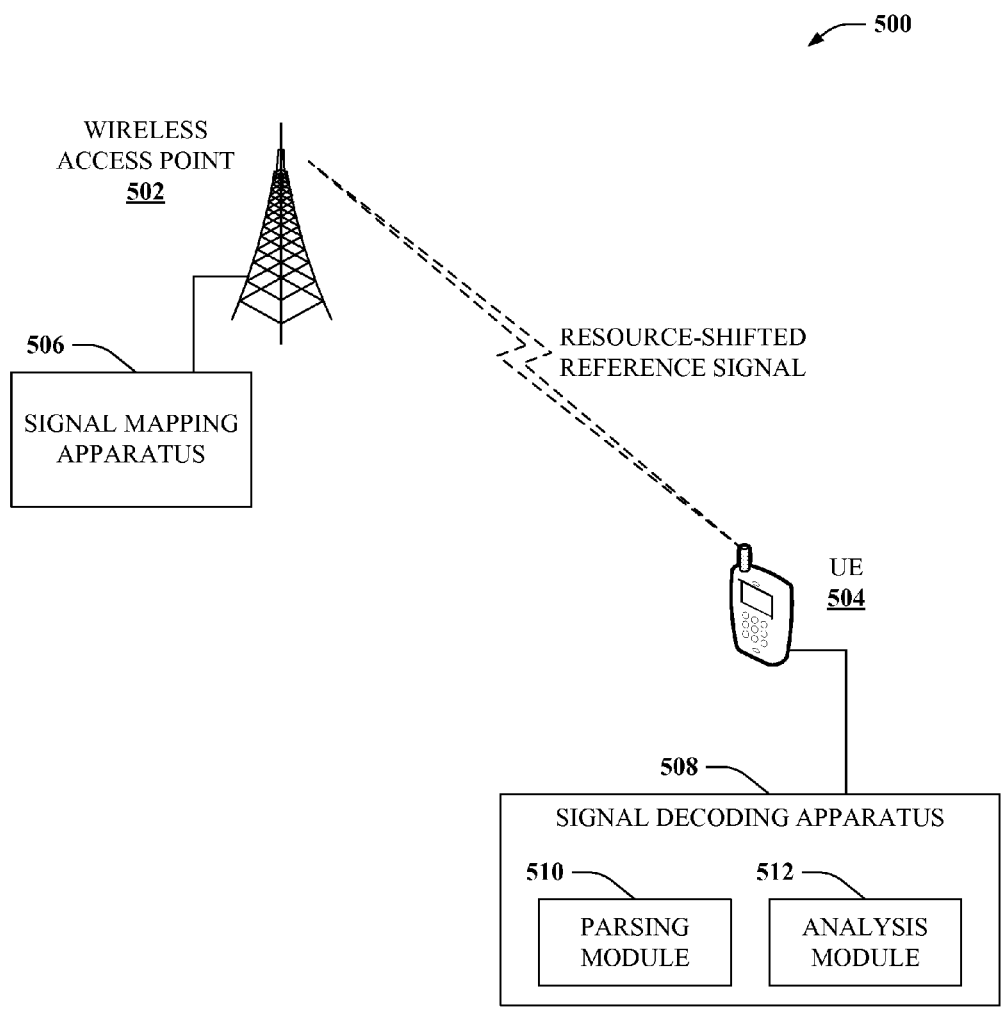
FIG. 5 illustrates a block diagram of a sample system for sending and receiving coded reference signals in wireless communications.

FIG. 5 depicts a block diagram of an example system 500 providing wireless communications between a wireless access point 502 and a wireless UE 504. Wireless access point 502 can employ a signal mapping apparatus 506 to generate a reference signal and allocate reference signal symbols to resources of a downlink wireless channel as a function of a cell ID associated with the wireless access point 502. It should be appreciated that signal mapping apparatus 506 can be substantially similar to signal mapping apparatus 202, discussed at FIG. 2, supra. The reference signal can then be wirelessly transmitted by wireless access point 502 on the allocated channel resources. In some aspects, the channel resources can comprise broadcast channel resources (e.g., for cell-specific reference signals), MBSFN broadcast resources (e.g., for cell-specific MBSFN reference signals), or unicast channel resources (e.g., for UE-specific reference signals).

UE 504 can receive signals transmitted by wireless access point 502 and decode the signals to extract the reference signal symbols contained therein. Specifically, UE 504 can employ a signal decoding apparatus 508 for analyzing and decoding wireless signals obtained by a receive antenna of UE 504. Signal decoding apparatus 508 can comprise a parsing module 510 that analyzes decoded symbols in the received signals. Furthermore, parsing module 510 can be configured to identify instructions within the decoded symbols pertaining to one or more dedicated reference signals. For instance, the instructions could specify whether a reference signal pertinent to communication involving UE 504 is included in the received signal. Furthermore, the instructions can specify a resource block in which such reference signal is contained, as well as instructions for decoding the reference signal. In at least some aspects of the subject disclosure, the instructions can be contained in higher layer messaging (e.g., layer 2 messaging or layer 3 messaging). According to still other aspects, parsing module 510 can employ the instructions to identify the reference signal as a common reference signal, such as a cell-specific reference signal, or a dedicated reference signal, such as a cell-specific MBSFN reference signal or a UE-specific reference signal. Decoding instructions, and optionally signal type, are provided to an analysis module 512.

Further to the above, analysis module 512 can be configured to decode a reference signal identified by parsing module 510. In some aspects, the analysis module 512 can employ a function of a cell ID associated with wireless access point 502 (e.g., obtained from a pilot signal or synchronization signal transmitted by the access point 502, or contained within the instructions identified by parsing module 510) for the decoding. Once decoded, the reference signal can be employed in decoding traffic or other messaging included in signals transmitted by wireless access point 502.

Figure 6:
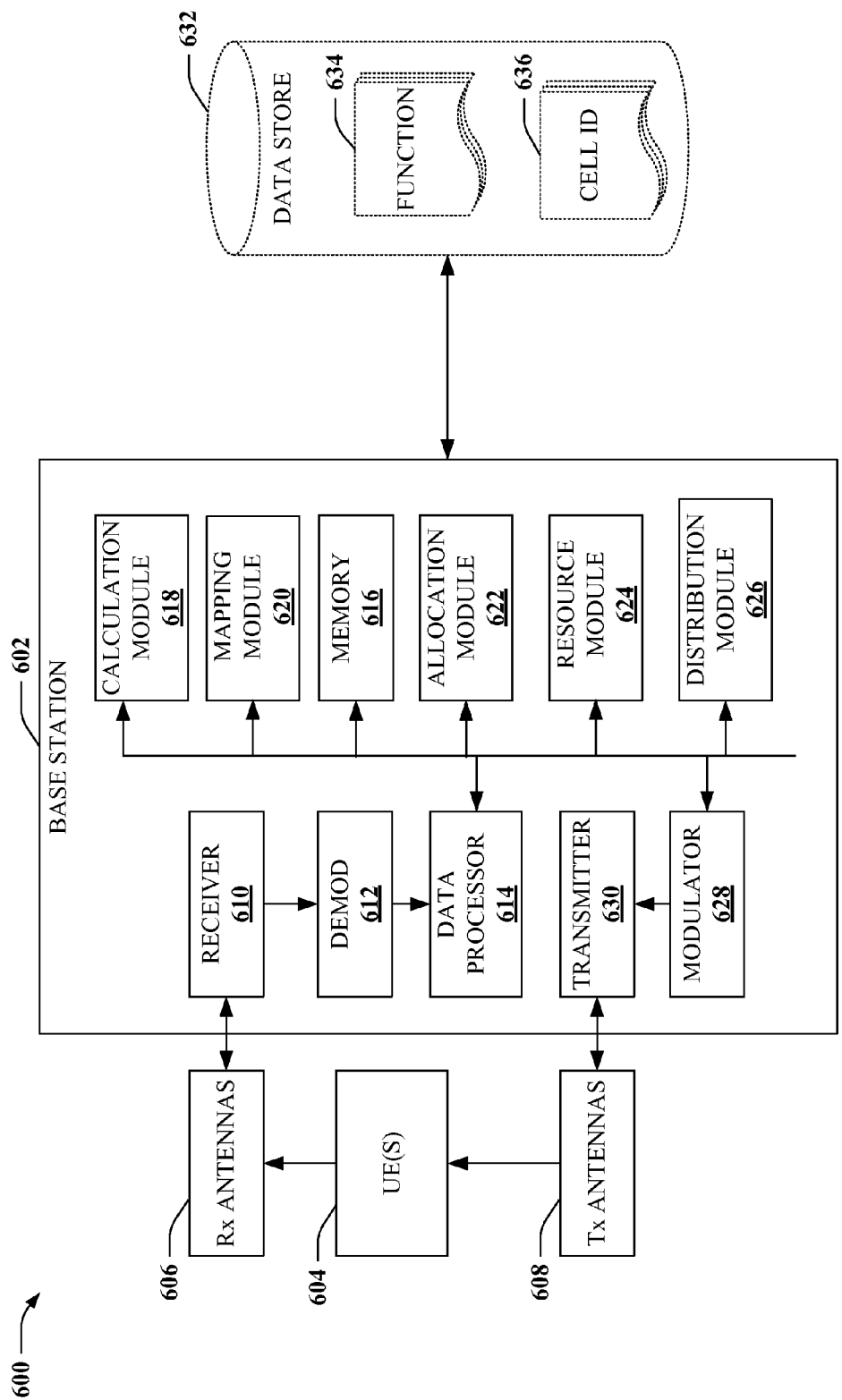
FIG. 6 illustrates a block diagram of an example system comprising a base station configured for mitigating noise for dedicated wireless reference signals.

FIG. 6 illustrates a block diagram of an example system 600 according to aspects of the subject disclosure. Specifically, system 600 can comprise a base station 602 configured to transmit wireless reference signals based at least in part on a cell ID associated with the base station 602. More precisely, base station 602 can map reference signals to wireless channel resources as a function of the cell ID. The function of the cell ID can allocate signal resources in a manner dependent on the cell ID. In some aspects, different functions of the cell ID can be employed by base station 602 for mapping different types of reference signals. The different mapping functions can yield noise randomization between one type of reference signal and another type of reference signal, as well as yield noise randomization for reference signals as compared with other signals transmitted by base station 602.

Base station 602 (e.g., access point, . . . ) can comprise a receiver 610 that obtains wireless signals from one or more of UEs 604 through one or more receive antennas 606, and a transmitter 630 that sends coded/modulated wireless signals provided by modulator 628 to the one or more UEs 604 through a transmit antenna(s) 608. Receiver 610 can obtain information from receive antennas 606 and can further comprise a signal recipient (not shown) that receives uplink data transmitted by UE(s) 604. Additionally, receiver 610 is operatively associated with a demodulator 612 that demodulates received information. Demodulated symbols are analyzed by a data processor 614. Data processor 614 is coupled to a memory 616 that stores information related to functions provided or implemented by base station 602. In one instance, stored information can comprise rules or protocols for parsing wireless signals provided by one or more of the UT(s) 604. Further to the above, data processor 614 can be coupled to a data store 632 that stores information pertaining to encoding wireless signals based on a cell ID 636 associated with base station 602. Specifically, the data store 634 can comprise one or more functions 634 for mapping reference signals to downlink channel resources based on the cell ID 636.

In addition to the foregoing, base station 602 can comprise a calculation module 618 for generating sequences of symbols for reference signals transmitted by base station 602. Additionally, a mapping module 620 can be employed to allocate the reference signal symbols to a wireless channel. The mapping module 620 can obtain a resource block from an allocation module 622, based on an antenna port utilized to transmit the reference signal. Additionally, a resource module 624 can select a particular function 634 for the allocation, optionally based on the particular antenna port utilized, or based on a type of reference signal to be transmitted. In at least one aspect of the subject disclosure, base station 602 can further comprise a distribution module 626 for generating copies of the reference signals for multi-antenna transmission. In such case, a virtual cell ID associated with a set of transmit antennas (608) can be employed to provide a common cell ID-dependent mapping for respective components of the multi-antenna transmission. Accordingly, a receiving UE 604 can distinguish the respective components from other wireless signals transmitted by base station 602 based on the common cell ID-dependent mapping.

Figure 7:
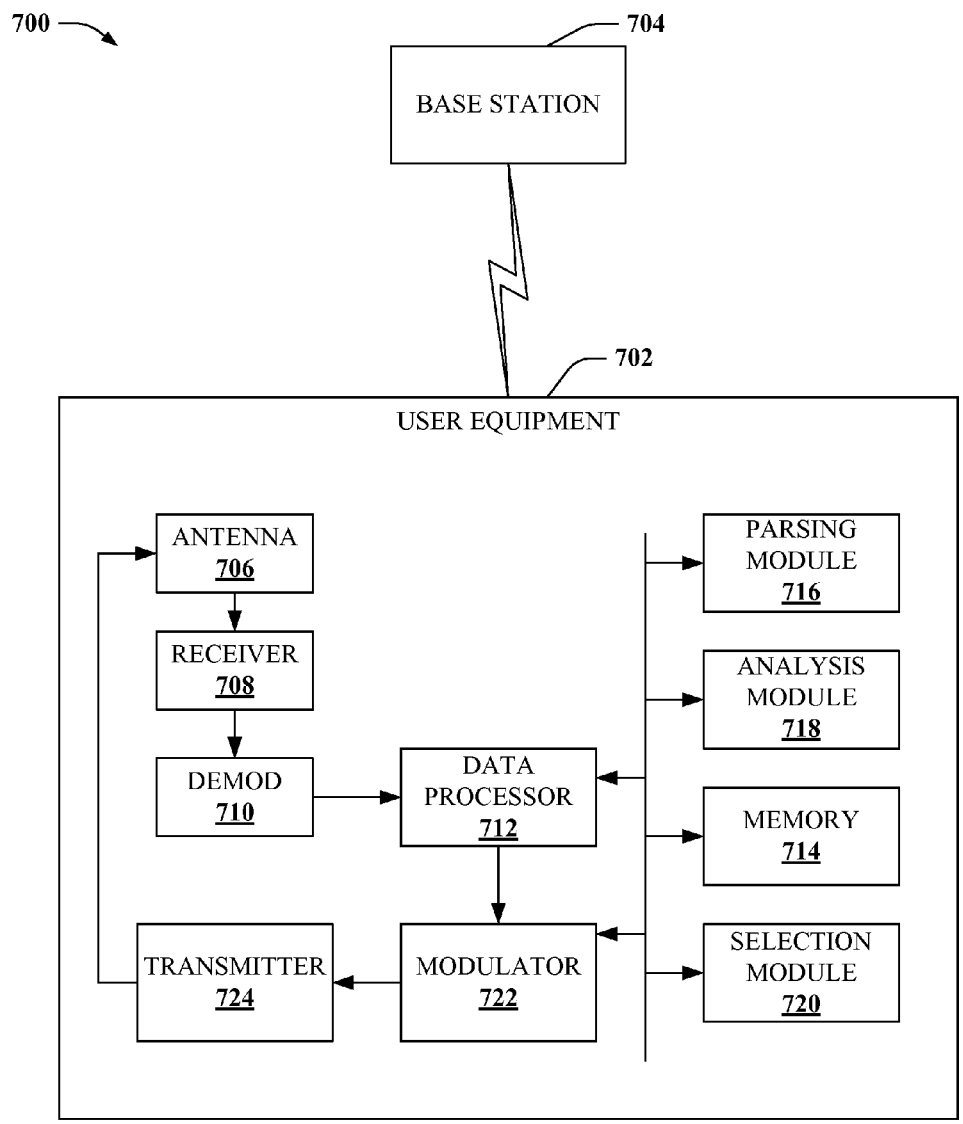
FIG. 7 depicts a block diagram of a sample system comprising a UE configured for decoding cell-specific reference signals according to some aspects.

FIG. 7 depicts a block diagram of an example system comprising an UE 702 configured for wireless communication according to aspects of the subject disclosure. UE 702 can be configured to wirelessly couple with one or more base stations 704 (e.g., access point) of a wireless network. Based on such configuration, UE 702 can receive wireless signals from a base station (604) on a forward link channel and respond with wireless signals on a reverse link channel. In addition, UE 702 can comprise instructions stored in memory 714 for analyzing received wireless signals, extracting instructions from the analyzed signals identifying pertinent reference signals, or the like, as described herein.

UE 702 includes at least one antenna 706 (e.g., a wireless transmission/reception interface or group of such interfaces comprising an input/output interface) that receives a signal and receiver(s) 708, which performs typical actions (e.g., filters, amplifies, down-converts, etc.) on the received signal. In general, antenna 706 and a transmitter 724 (collectively referred to as a transceiver) can be configured to facilitate wireless data exchange with base station(s) 704.

Antenna 706 and receiver(s) 708 can also be coupled with a demodulator 710 that can demodulate received symbols and provide such signals to a data processor(s) 712 for evaluation. It should be appreciated that data processor(s) 712 can control and/or reference one or more components (706, 708, 710, 714, 716, 718, 720, 722, 724) of the UE 702. Further, data processor(s) 712 can execute one or more modules, applications, engines, or the like (716, 718, 720) that comprise information or controls pertinent to executing functions of the UE 702. For instance, such functions can include obtaining a cell ID for base station(s) 704, employing the cell ID for decoding reference signals transmitted by the base station(s) 704, or like operations, as described herein.

Additionally, memory 714 of UE 702 is operatively coupled to data processor(s) 712. Memory 714 can store data to be transmitted, received, and the like, and instructions suitable to conduct wireless communication with a remote device (604). Specifically, the instructions can be utilized to implement the various functions described above, or elsewhere herein. Further, memory 714 can store the modules, applications, engines, etc. (716, 718, 720) executed by data processor(s) 712, above.

Additionally, UE 702 can comprise a parsing module 716 that identifies an instruction within a received wireless signal pertaining to a dedicated reference signal transmitted by base station(s) 704. In some aspects, the instruction is specified in a higher layer signaling protocol employed by base station(s) 704, such as a non-physical layer protocol. Based on the instruction, parsing module 716 can locate the reference signal within the received wireless signal, and can further determine whether the signal is a MBSFN signal or a UE-specific signal.

UE 702 can employ an analysis module 718 to decode the dedicated reference signal as a function of an ID of base station(s) 704. In some aspects, a selection module 720 can provide analysis module 718 with a first function of the base station ID for decoding a UE-specific reference signal. Additionally, selection module 720 can provide analysis module 718 with a second function of the base station ID for decoding a MBSFN reference signal, in such aspects. In at least one aspect, the first and second functions of the base station ID can employ a common resource shift based on the base station ID. In another aspect, the first and second functions can employ different resource shifts based on the base station ID for decoding the signals.

According to particular aspects, UE 702 can also employ the analysis module 718 to decode a cell-specific reference signal included within a received wireless signal. In such aspects, the selection module can provide a decoding function, dependent on the base station ID, for decoding the cell-specific reference signal. Such decoding function can be similar to the first or second functions of the base station ID, or distinct from either function.

The aforementioned systems have been described with respect to interaction between several components, modules and/or communication interfaces. It should be appreciated that such systems and components/modules/interfaces can include those components or sub-components specified therein, some of the specified components or sub-components, and/or additional components. For example, a system could include UE 504 coupled with signal decoding apparatus 508, and wireless access point 502 coupled with signal mapping apparatus 202, which comprises system 300, or a different combination of these or other components. Sub-components could also be implemented as components communicatively coupled to other components rather than included within parent components. Additionally, it should be noted that one or more components could be combined into a single component providing aggregate functionality. For instance, calculation module 206 can include mapping module 408, or vice versa, to facilitate generating a resource signal and mapping the resource signal to resources of a wireless channel by way of a single component. The components can also interact with one or more other components not specifically described herein but known by those of skill in the art.

Furthermore, as will be appreciated, various portions of the disclosed systems above and methods below may include or consist of artificial intelligence or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, and in addition to that already described herein, can automate certain mechanisms or processes performed thereby to make portions of the systems and methods more adaptive as well as efficient and intelligent.

In view of the exemplary systems described supra, methodologies that may be implemented in accordance with the disclosed subject matter will be better appreciated with reference to the flow charts of FIGS. 8-11. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter. Additionally, it should be further appreciated that the methodologies disclosed hereinafter and throughout this specification are capable of being stored on an article of manufacture to facilitate transporting and transferring such methodologies to computers. The term article of manufacture, as used, is intended to encompass a computer program accessible from any computer-readable device, device in conjunction with a carrier, or storage medium.

Figure 8:
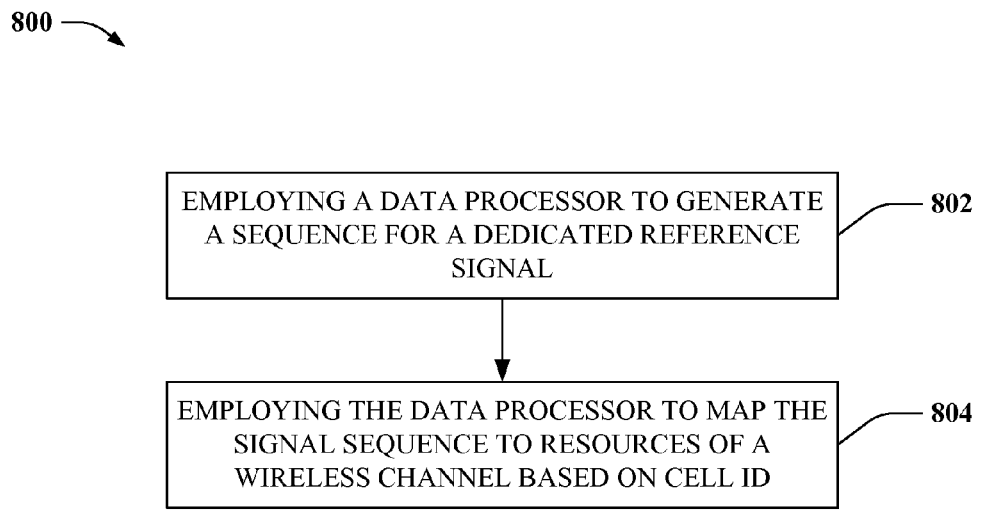
FIG. 8 illustrates a flowchart of an example methodology for noise mitigation for wireless reference signals according to some aspects.

FIG. 8 depicts a flowchart of an example methodology 800 for cell-specific signal mapping according to aspects of the subject disclosure. At 802, method 800 can employ a data processor to generate a sequence for a dedicated reference signal. The sequence can comprise, for instance, a two-dimensional sequence generated from a two-dimensional sequencing algorithm or matrix. Furthermore, the sequence can be based on a normal cyclic prefix of such algorithm, or an extended shifted prefix, as described herein or known in the art. Moreover, the sequence can be generated for a cell-specific MBSFN dedicated reference signal, or a UE-specific dedicated reference signal. In one aspect of the subject disclosure, a common sequencing algorithm can be employed for the MBSFN signal and UE-specific signal. In another aspect, separate sequencing algorithms can be employed for generating the MBSFN signal and the UE-specific signal, respectively.

At 804, method 800 can employ the data processor to map symbols of the generated sequence to resources of a wireless channel. Furthermore, the mapping can be based on a cell ID. For instance, the mapping can employ the cell ID to locate a symbol tone within a frequency subcarrier, a signal subframe, a set of CDMA codes, or a set of OFDM symbols of a wireless signal. In at least one aspect, the cell ID can be employed to shift resource mapping in frequency, time, or other channel resource. Accordingly, signal randomization can be provided for the mapped reference signal, based on the cell ID. A terminal receiving the mapped sequence can decode the symbols by employing a suitable decoding function also based on the cell ID. The terminal then can utilize the reference signal for decoding other data within the wireless signal, such as control channel data, pilot or synchronization data, traffic data, multimedia data, broadcast data, unicast data, and so on.

Figure 9:
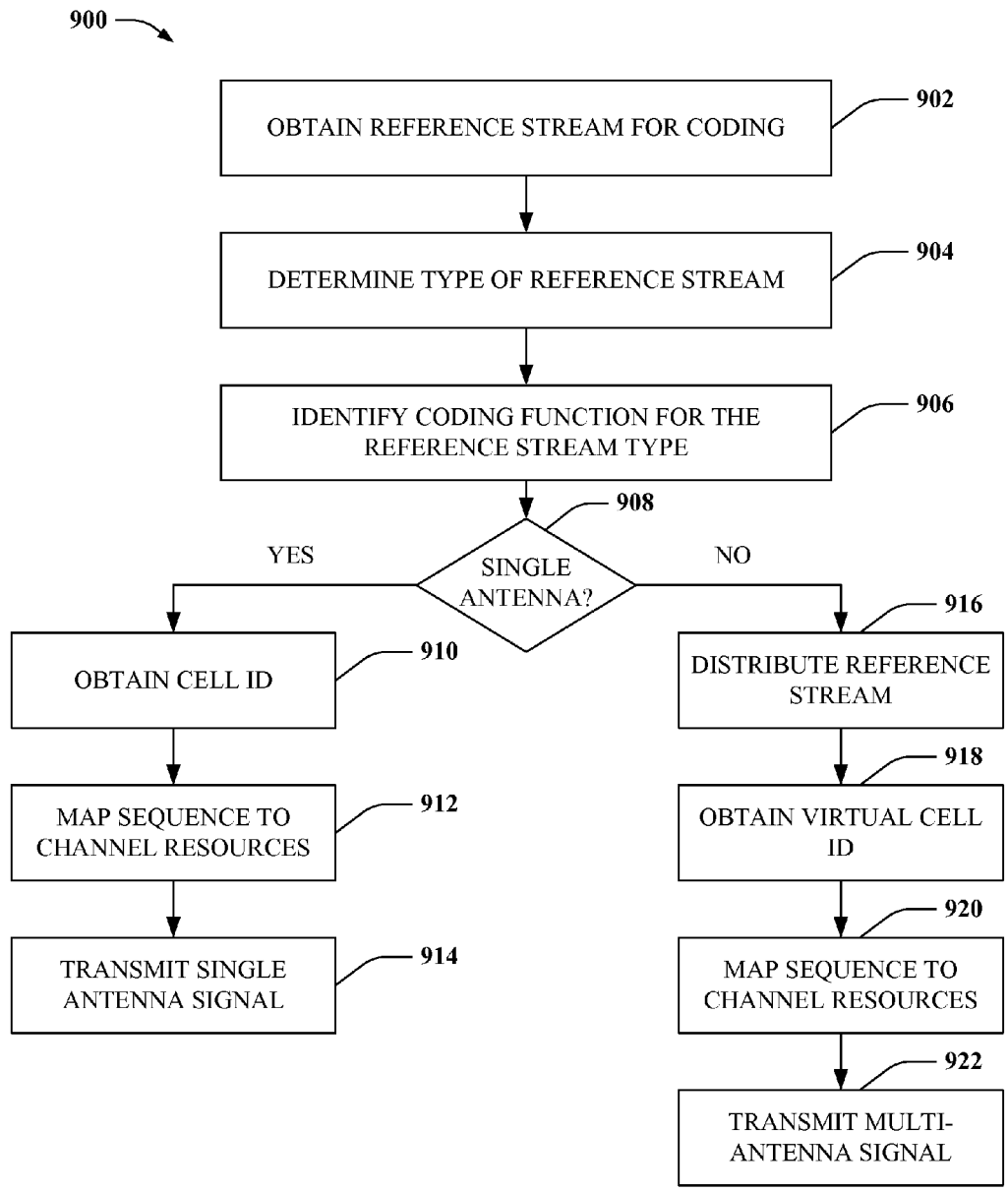
FIG. 9 depicts a flowchart of a sample methodology for mapping reference signals to wireless channel resources according to one or more aspects.

FIG. 9 illustrates a flowchart of a sample methodology 900 for mapping reference signals to resources of a wireless signal. At 902, method 900 can obtain a stream of reference signal symbols for encoding. At 904, method 900 can determine a type of reference signal to be generated from the stream. Examples can include common reference signals or dedicated reference signals. At 906, method 900 can identify a coding function suitable for the type of reference signal. At 908, a determination is made as to whether the reference signal is for single antenna or multi-antenna communication. If for single antenna communication, method 900 can proceed to 910; otherwise method 900 can proceed to 916.

At 910, method 900 can obtain a cell ID for a cell transmitting the reference signal. At 912, method 900 can map the stream of reference signal symbols to resources of a wireless channel, based at least in part on the cell ID and the identified coding function. At 914, method 900 can transmit the single antenna reference signal on the resources of the wireless channel determined at reference number 912.

At 916, method 900 can generate copies of the stream of reference signal symbols for distribution to disparate antennas of a multi-antenna communication. At 918, method 900 can obtain a virtual cell ID representing a set of antennas involved in the multi-antenna communication. At 920, method 900 can map respective reference signal symbols to resources of a wireless channel based at least in part on a function of the virtual cell ID. At 922, method 900 can distribute the mapped reference signals to respective antennas of the multi-antenna communication to facilitate transmission of the signal.

Figure 10:
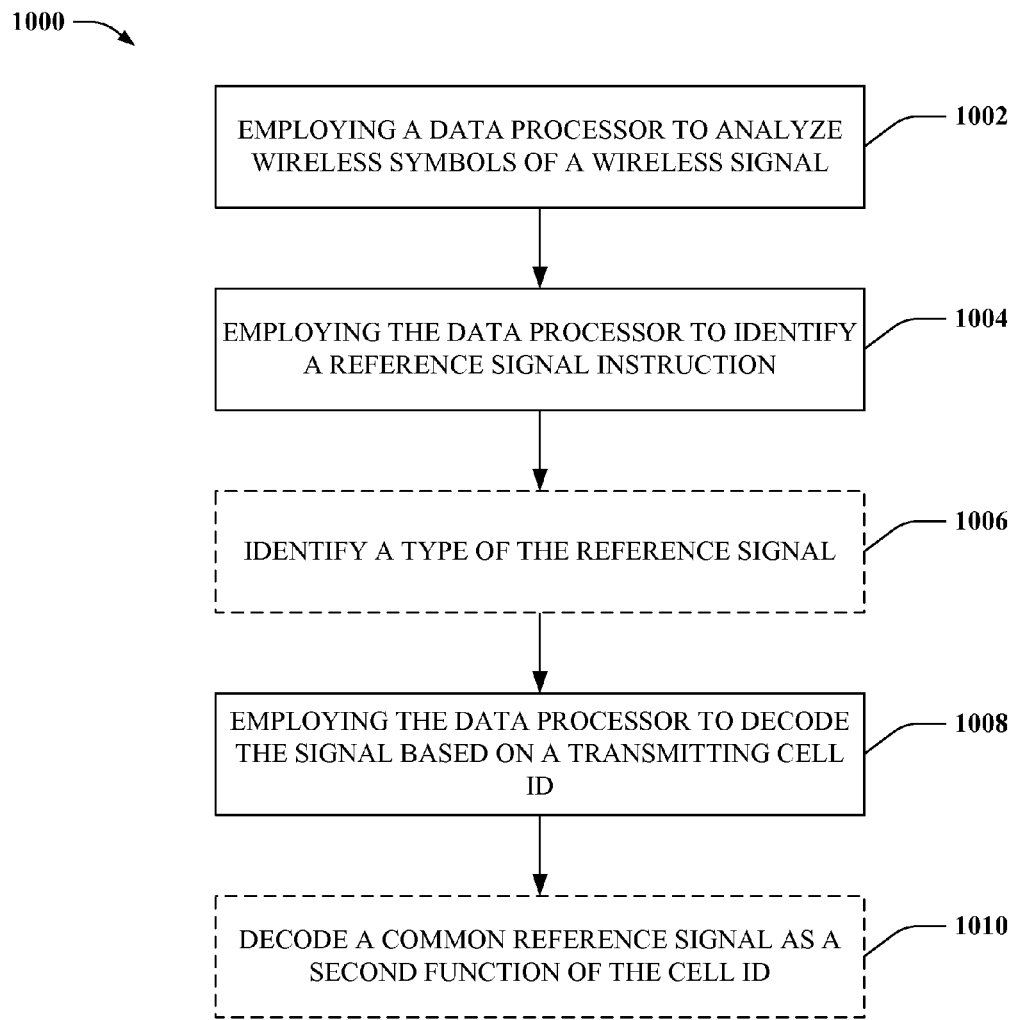
FIG. 10 illustrates a flowchart of a sample methodology for decoding dedicated reference signals according to additional aspects.

FIG. 10 depicts a flowchart of an example methodology 1000 according to aspects of the subject disclosure. At 1002, method 1000 can employ a data processor to analyze wireless symbols of a received wireless signal. At 1004, method 1000 can employ the data processor to identify a reference signal instruction contained within the received wireless signal. In one aspect of the subject disclosure, the reference signal instruction can be a second or third layer signaling protocol message. At 1006, method 1000 can optionally identify a type of reference signal identified by the instruction. The type can include a common reference signal or a dedicated reference signal. Additionally, at 1008, method 1000 can employ the data processor to decode the reference signal based on a transmitting cell ID. Decoding the reference signal can be in accordance with the instruction identified at reference number 1004. Furthermore, at 1010, method 1000 can optionally decode a common reference signal contained within the received wireless signal. Decoding the common reference signal can be implemented as a second function of the transmitting cell ID. Specifically, the second function can specify a resource shift for the common reference signal, similar to or distinct from a resource shift utilized for decoding the reference signal.

Figure 11:
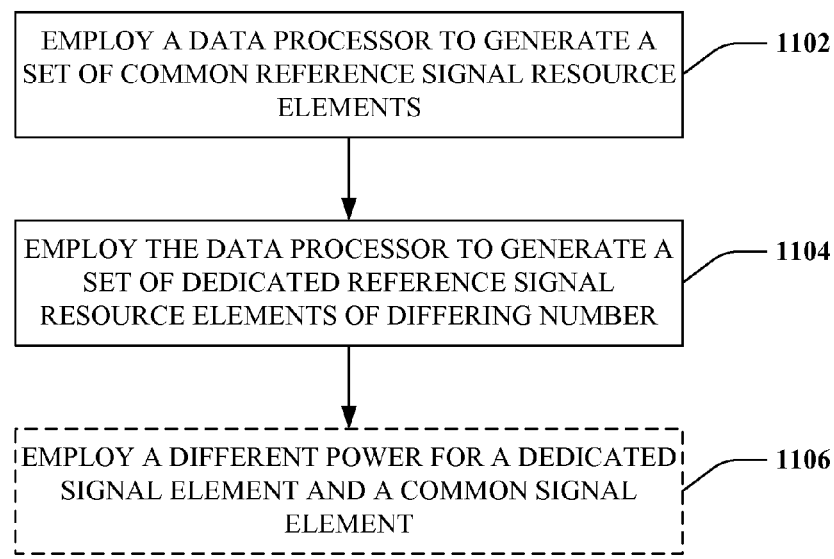
FIG. 11 depicts a flowchart of an example methodology for providing power disparity for common and dedicated reference signals.

FIG. 11 illustrates a flowchart of an example methodology 1100 according to additional aspects of the subject disclosure. At 1102, method 1100 can employ a data processor to generate a set of common reference signal resource elements. Furthermore, the common reference signal resource elements can comprise a specific number of common resource symbols. At 1104, method 1100 can employ the data processor to generate a set of dedicated reference signal resource elements. Moreover, the dedicated reference signal resource elements can comprise a particular number of dedicated resource symbols, different from the specific number of common resource symbols. At 1106, method 1100 can optionally allocate a different power for transmitting at least one dedicated signal element as compared with a power allocated for transmitting at least one of the common signal elements.

Figure 12:
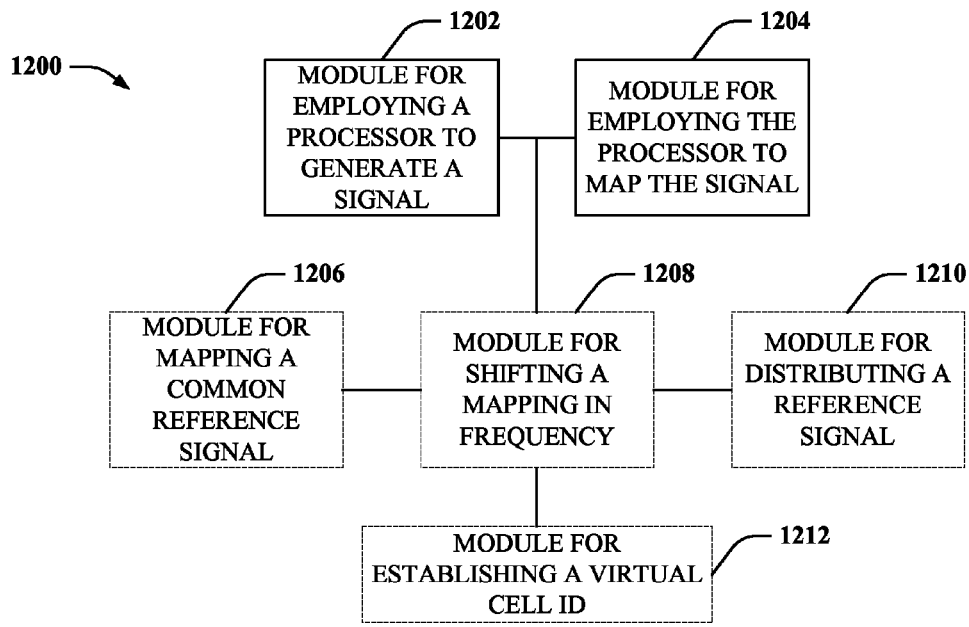
FIGS. 12 and 13 illustrate block diagrams of example systems for encoding and decoding, respectively, wireless reference signals.
Figure 13:
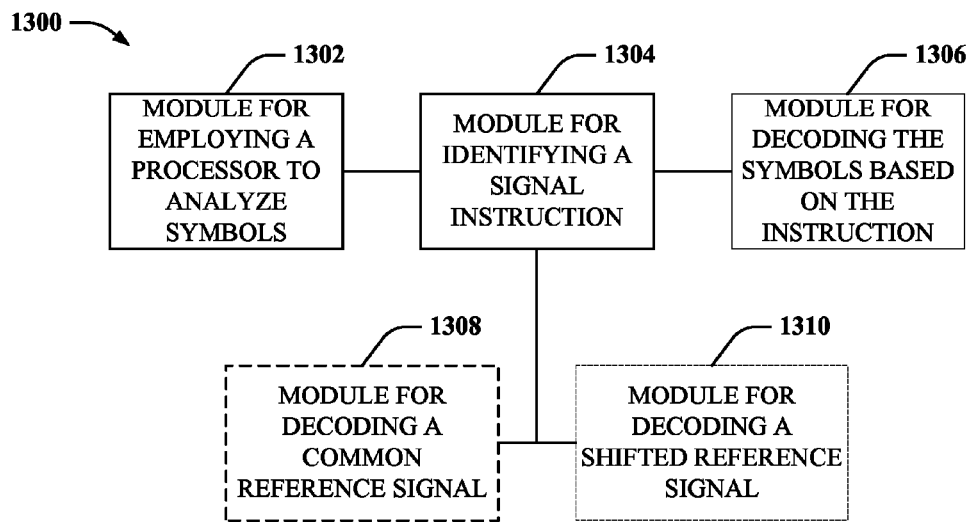

FIGS. 12 and 13 depict block diagrams of example systems 1200, 1300 for coding and decoding, respectively, dedicated reference signals as a function of cell ID, according to aspects of the subject disclosure. For example, systems 1200 and 1300 can reside at least partially within a wireless communication network and/or within a transmitter such as a node, base station, access point, user terminal, personal computer coupled with a mobile interface card, or the like. It is to be appreciated that systems 1200 and 1300 are represented as including functional blocks, which can be functional blocks that represent functions implemented by a processor, software, or combination thereof (e.g., firmware).

System 1200 can comprise a module 1202 for employing a data processor to generate a sequence for a dedicated reference signal. Additionally, system 1200 can comprise a module 1204 for employing the data processor to map symbols of the dedicated reference signal sequence to resources of a wireless signal at least in part based on a function of a cell ID transmitting the dedicated reference signal. Further to the above, system 1200 can comprise one or more of a set of optional modules 1206, 1208, 1210 and 1212. Specifically, system 1200 can optionally comprise a module 1206 for mapping symbols of a common reference signal to other resources of the wireless signal. The system 1200 can optionally employ a module 1208 for shifting the symbol mapping in frequency as a function of the cell ID. Furthermore, system 1200 can optionally comprise a module 1210 for distributing a reference signal (e.g., common reference signal or dedicated reference signal) to respective antennas of a multi-antenna arrangement. System 1200 can optionally employ a module 1212 for establishing a virtual cell ID for the multi-antenna arrangement to map the distributed reference signals to common resources of a wireless signal, specified by a function of the virtual cell ID.

System 1300 can comprise a module 1302 for employing a data processor to analyze symbols of a received wireless signal. Furthermore, system 1300 can comprise a module 1304 for identifying a signal instruction from the analyzed symbols pertaining to a reference signal within the wireless signal. The signal instruction can be employed, for instance, to locate the reference signal within the analyzed symbols and specify a function of a cell ID for decoding the reference signal. In addition to the foregoing, system 1300 can comprise a module 1306 for employing the function of the cell ID for decoding the reference signal symbols based on the identified signal instruction. In some aspects of the subject disclosure, system 1300 can optionally comprise a module 1308 for employing the function of the cell ID for decoding a common reference signal, identified by the signal instruction. Alternatively, system 1300 can optionally comprise a module 1310 for employing a frequency-shifted variation of the function of the cell ID decoding the common reference signal.

Figure 14:
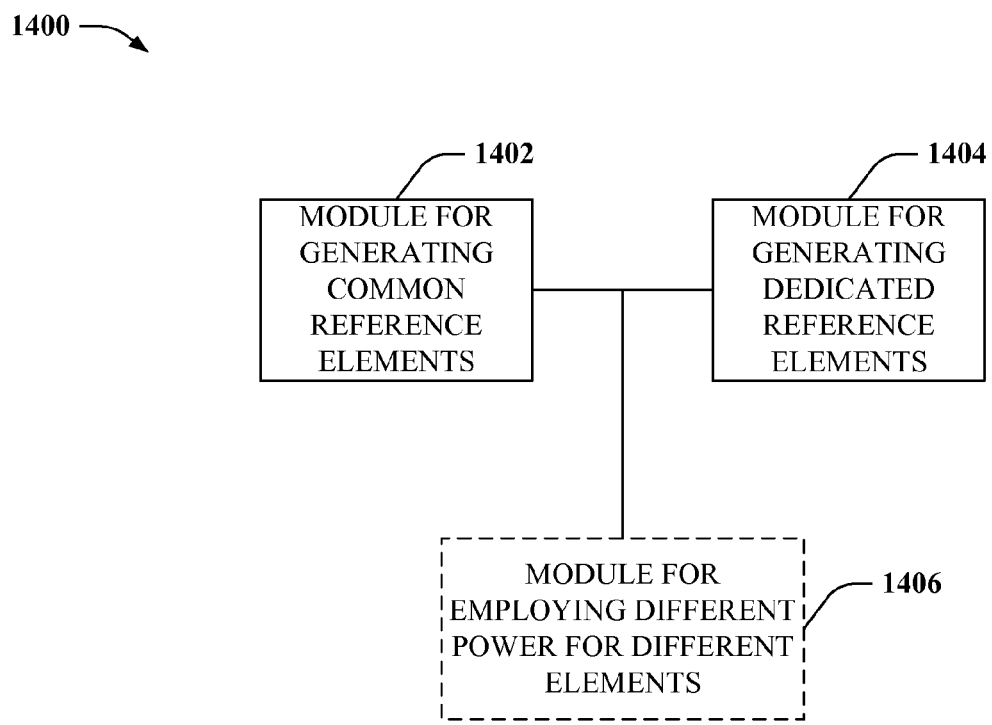
FIG. 14 illustrates a block diagram of a sample system for generating different transmit powers for common and dedicated reference signal elements.

FIG. 14 depicts a block diagram of an example system 1400 for generating reference signal symbols according to aspects of the subject disclosure. For example, system 1400 can reside at least partially within a wireless communication network and/or within a transmitter such as a node, base station, access point, user terminal, personal computer coupled with a mobile interface card, or the like. It is to be appreciated that system 1400 is represented as including functional blocks, which can be functional blocks that represent functions implemented by a processor, software, or combination thereof (e.g., firmware).

System 1400 can comprise a module 1402 for employing a data processor to generate a set of common reference signal resource elements comprising a number of common resource signal elements. Additionally, system 1400 can comprise a module 1404 for employing the data processor to generate a set of dedicated reference signal resource elements comprising a number of dedicated resource signal elements. In at least some aspects of the subject disclosure, module 1404 can generate a different number of dedicated resource signal elements as common resource signal elements generated by module 1402. Further to the above, system 1400 can optionally comprise a module 1406 for employing a different transmission power for transmitting at least one dedicated reference signal element as employed for transmitting at least one common reference signal element.

Figure 15:
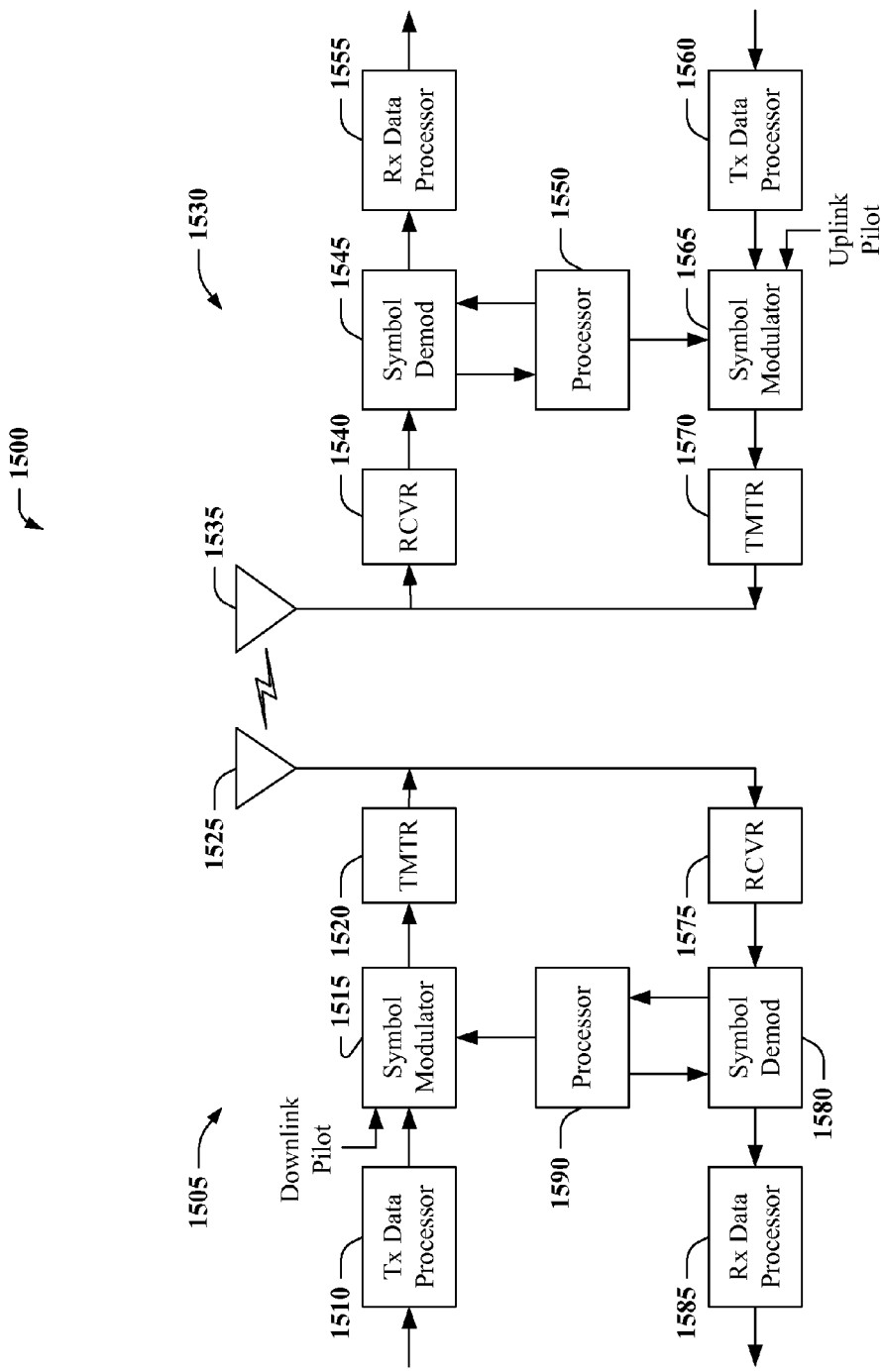
FIG. 15 illustrates a block diagram of an example wireless communication apparatus according to aspects disclosed herein.

FIG. 15 depicts a block diagram of an example system 1500 that can facilitate wireless communication according to some aspects disclosed herein. On a downlink, at access point 1505, a transmit (TX) data processor 1510 receives, formats, codes, interleaves, and modulates (or symbol maps) traffic data and provides modulation symbols ("data symbols"). A symbol modulator 1515 receives and processes the data symbols and pilot symbols and provides a stream of symbols. A symbol modulator 1520 multiplexes data and pilot symbols and provides them to a transmitter unit (TMTR) 1520. Each transmit symbol can be a data symbol, a pilot symbol, or a signal value of zero. The pilot symbols can be sent continuously in each symbol period. The pilot symbols can be frequency division multiplexed (FDM), orthogonal frequency division multiplexed (OFDM), time division multiplexed (TDM), code division multiplexed (CDM), or a suitable combination thereof or of like modulation and/or transmission techniques.

TMTR 1520 receives and converts the stream of symbols into one or more analog signals and further conditions (e.g., amplifies, filters, and frequency upconverts) the analog signals to generate a downlink signal suitable for transmission over the wireless channel. The downlink signal is then transmitted through an antenna 1525 to the terminals. At terminal 1530, an antenna 1535 receives the downlink signal and provides a received signal to a receiver unit (RCVR) 1540. Receiver unit 1540 conditions (e.g., filters, amplifies, and frequency downconverts) the received signal and digitizes the conditioned signal to obtain samples. A symbol demodulator 1545 demodulates and provides received pilot symbols to a processor 1550 for channel estimation. Symbol demodulator 1545 further receives a frequency response estimate for the downlink from processor 1550, performs data demodulation on the received data symbols to obtain data symbol estimates (which are estimates of the transmitted data symbols), and provides the data symbol estimates to an RX data processor 1555, which demodulates (i.e., symbol demaps), deinterleaves, and decodes the data symbol estimates to recover the transmitted traffic data. The processing by symbol demodulator 1545 and RX data processor 1555 is complementary to the processing by symbol modulator 1515 and TX data processor 1510, respectively, at access point 1505.

On the uplink, a TX data processor 1560 processes traffic data and provides data symbols. A symbol modulator 1565 receives and multiplexes the data symbols with pilot symbols, performs modulation, and provides a stream of symbols. A transmitter unit 1570 then receives and processes the stream of symbols to generate an uplink signal, which is transmitted by the antenna 1535 to the access point 1505. Specifically, the uplink signal can be in accordance with SC-FDMA requirements and can include frequency hopping mechanisms as described herein.

At access point 1505, the uplink signal from terminal 1530 is received by the antenna 1525 and processed by a receiver unit 1575 to obtain samples. A symbol demodulator 1580 then processes the samples and provides received pilot symbols and data symbol estimates for the uplink. An RX data processor 1585 processes the data symbol estimates to recover the traffic data transmitted by terminal 1530. A processor 1590 performs channel estimation for each active terminal transmitting on the uplink. Multiple terminals can transmit pilot concurrently on the uplink on their respective assigned sets of pilot subbands, where the pilot subband sets can be interlaced.

Processors 1590 and 1550 direct (e.g., control, coordinate, manage, etc.) operation at access point 1505 and terminal 1530, respectively. Respective processors 1590 and 1550 can be associated with memory units (not shown) that store program codes and data. Processors 1590 and 1550 can also perform computations to derive frequency and impulse response estimates for the uplink and downlink, respectively.

For a multiple-access system (e.g., SC-FDMA, FDMA, OFDMA, CDMA, TDMA, etc.), multiple terminals can transmit concurrently on the uplink. For such a system, the pilot subbands can be shared among different terminals. The channel estimation techniques can be used in cases where the pilot subbands for each terminal span the entire operating band (possibly except for the band edges). Such a pilot subband structure would be desirable to obtain frequency diversity for each terminal. The techniques described herein can be implemented by various means. For example, these techniques can be implemented in hardware, software, or a combination thereof. For a hardware implementation, which can be digital, analog, or both digital and analog, the processing units used for channel estimation can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. With software, implementation can be through modules (e.g., procedures, functions, and so on) that perform the functions described herein. The software codes can be stored in memory unit and executed by the processors 1590 and 1550.

Figure 16:
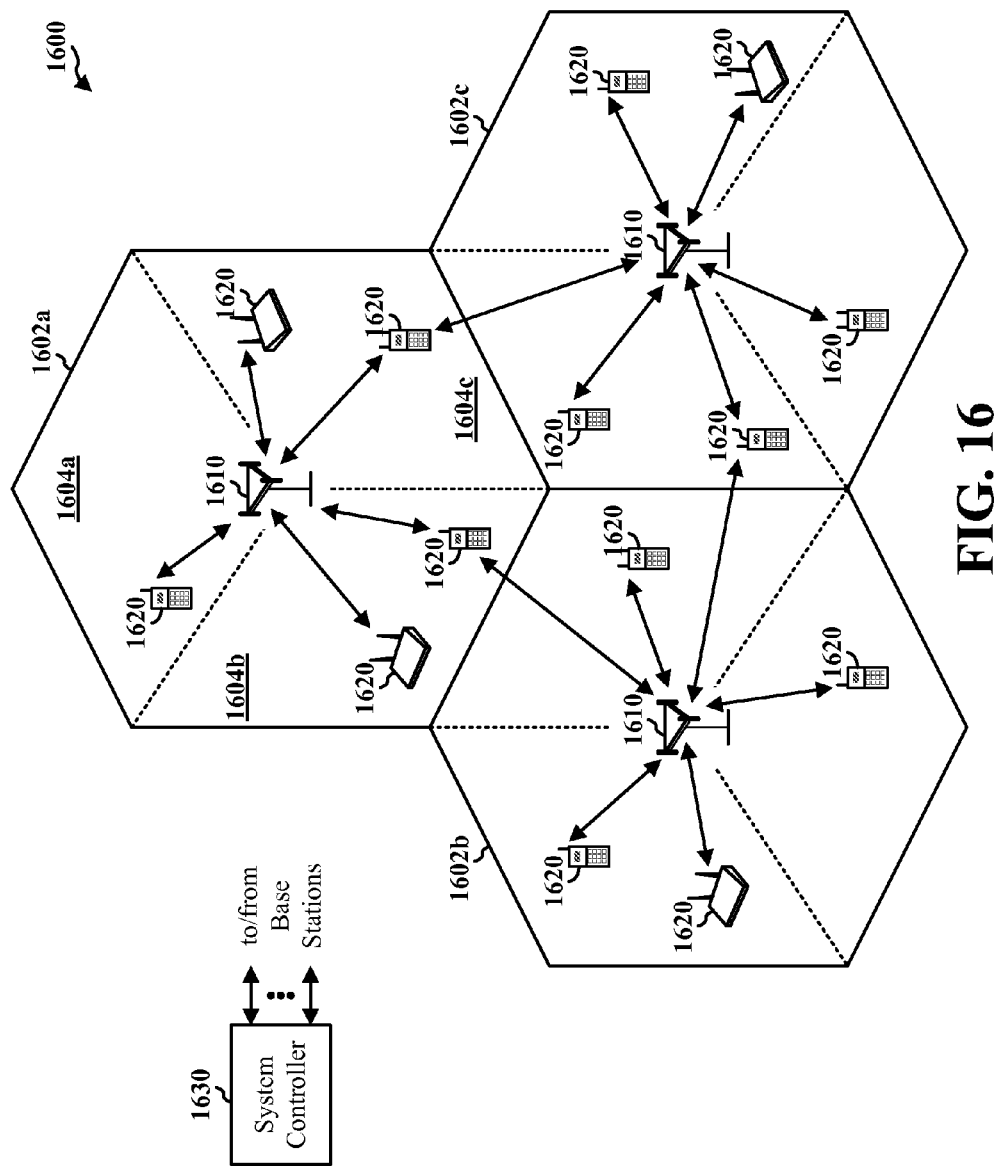
FIG. 16 depicts a block diagram of a sample cellular environment for wireless communication between wireless devices.

FIG. 16 illustrates a wireless communication system 1600 with multiple base stations (BSs) 1610 (e.g., wireless access points, wireless communication apparatus) and multiple terminals 1620 (e.g., ATs), such as can be utilized in conjunction with one or more aspects. A BS (1610) is generally a fixed station that communicates with the terminals and can also be called an access point, a Node B, or some other terminology. Each BS 1610 provides communication coverage for a particular geographic area or coverage area, illustrated as three geographic areas in FIG. 16, labeled 1602a, 1602b, and 1602c. The term "cell" can refer to a BS or its coverage area depending on the context in which the term is used. To improve system capacity, a BS geographic area/coverage area can be partitioned into multiple smaller areas (e.g., three smaller areas, according to cell 1602a in FIG. 16), 1604a, 1604b, and 1604c. Each smaller area (1504a, 1604b, 1604c) can be served by a respective base transceiver subsystem (BTS). The term "sector" can refer to a BTS or its coverage area depending on the context in which the term is used. For a sectorized cell, the BTSs for all sectors of that cell are typically co-located within the base station for the cell. The transmission techniques described herein can be used for a system with sectorized cells as well as a system with un-sectorized cells. For simplicity, in the subject description, unless specified otherwise, the term "base station" is used generically for a fixed station that serves a sector as well as a fixed station that serves a cell.

Terminals 1620 are typically dispersed throughout the system, and each terminal 1620 can be fixed or mobile. Terminals 1620 can also be called a mobile station, user equipment, a user device, wireless communication apparatus, an access terminal, a user terminal or some other terminology. A terminal 1620 can be a wireless device, a cellular phone, a personal digital assistant (PDA), a wireless modem card, and so on. Each terminal 1620 can communicate with zero, one, or multiple BSs 1610 on the downlink (e.g., FL) and uplink (e.g., RL) at any given moment. The downlink refers to the communication link from the base stations to the terminals, and the uplink refers to the communication link from the terminals to the base stations.

For a centralized architecture, a system controller 1630 couples to base stations 1610 and provides coordination and control for BSs 1610. For a distributed architecture, BSs 1610 can communicate with one another as needed (e.g., by way of a wired or wireless backhaul network communicatively coupling the BSs 1610). Data transmission on the forward link often occurs from one access point to one access terminal at or near the maximum data rate that can be supported by the forward link or the communication system. Additional channels of the forward link (e.g., control channel) can be transmitted from multiple access points to one access terminal. Reverse link data communication can occur from one access terminal to one or more access points.

Figure 17:
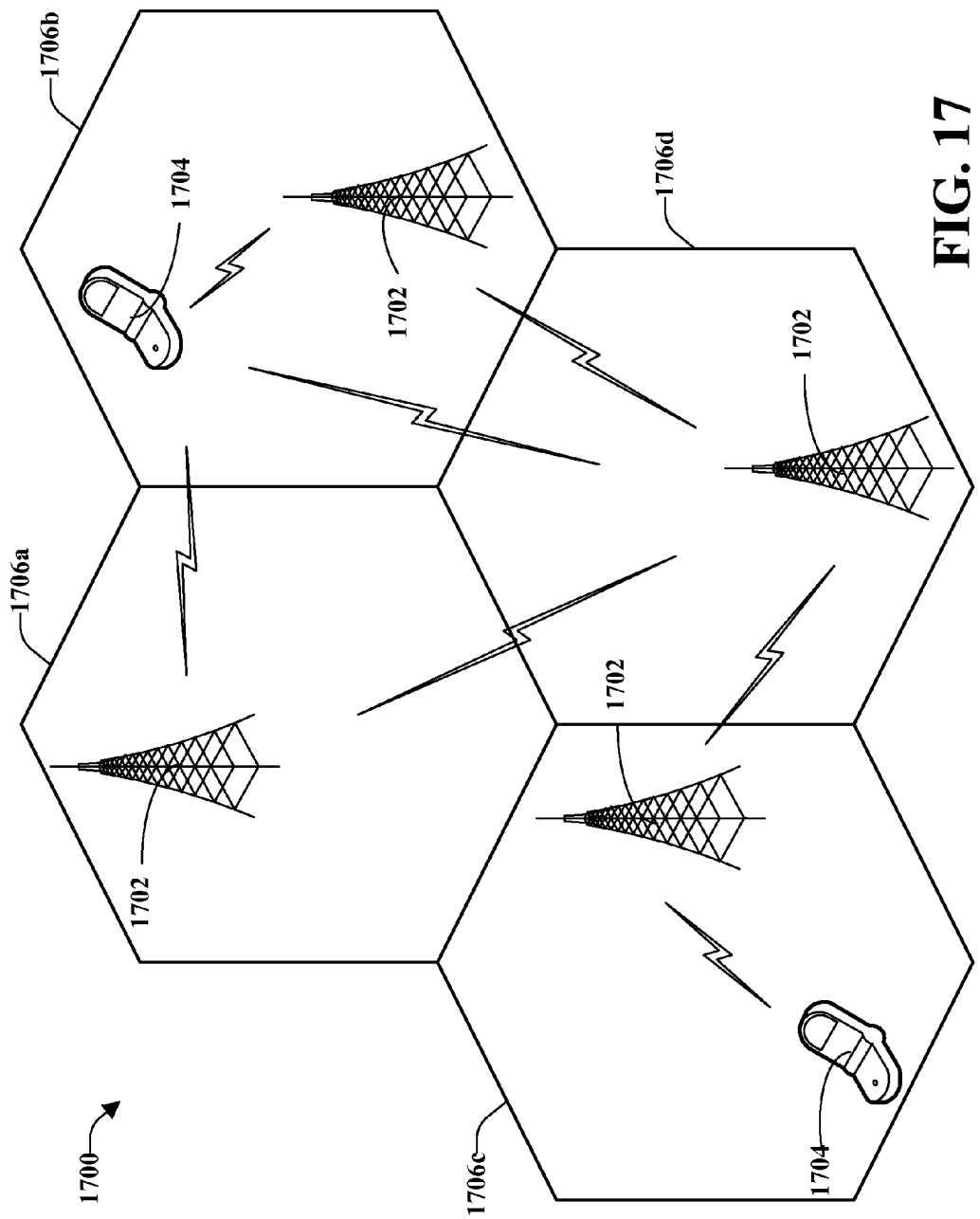
FIG. 17 illustrates a block diagram of an example wireless signaling environment for wireless communications.

FIG. 17 is an illustration of a planned or semi-planned wireless communication environment 1700, in accordance with various aspects. System 1700 can comprise one or more BSs 1702 in one or more cells and/or sectors that receive, transmit, repeat, etc., wireless communication signals to each other and/or to one or more mobile devices 1704. As illustrated, each BS 1702 can provide communication coverage for a particular geographic area, illustrated as four geographic areas, labeled 1706a, 1706b, 1706c and 1706d. Each BS 1702 can comprise a transmitter chain and a receiver chain, each of which can in turn comprise a plurality of components associated with signal transmission and reception (e.g., processors, modulators, multiplexers, demodulators, demultiplexers, antennas, and so forth, see FIG. 6), as will be appreciated by one skilled in the art. Mobile devices 1704 can be, for example, cellular phones, smart phones, laptops, handheld communication devices, handheld computing devices, satellite radios, global positioning systems, PDAs, or any other suitable device for communicating over wireless network 1700. System 1700 can be employed in conjunction with various aspects described herein in order to facilitate coding and decoding reference signals in wireless communications as a function of cell ID, as set forth herein.

As used in the subject disclosure, the terms "component," "system," "module" and the like are intended to refer to a computer-related entity, either hardware, software, software in execution, firmware, middle ware, microcode, and/or any combination thereof. For example, a module can be, but is not limited to being, a process running on a processor, a processor, an object, an executable, a thread of execution, a program, a device, and/or a computer. One or more modules can reside within a process, or thread of execution; and a module can be localized on one electronic device, or distributed between two or more electronic devices. Further, these modules can execute from various computer-readable media having various data structures stored thereon. The modules can communicate by way of local or remote processes such as in accordance with a signal having one or more data packets (e.g., data from one component interacting with another component in a local system, distributed system, or across a network such as the Internet with other systems by way of the signal). Additionally, components or modules of systems described herein can be rearranged, or complemented by additional components/modules/systems in order to facilitate achieving the various aspects, goals, advantages, etc., described with regard thereto, and are not limited to the precise configurations set forth in a given figure, as will be appreciated by one skilled in the art.

Furthermore, various aspects are described herein in connection with a UT. A UT can also be called a system, a subscriber unit, a subscriber station, mobile station, mobile, mobile communication device, mobile device, remote station, remote terminal, access terminal (AT), user agent (UA), a user device, or user equipment (UE). A subscriber station can be a cellular telephone, a cordless telephone, a Session Initiation Protocol (SIP) phone, a wireless local loop (WLL) station, a personal digital assistant (PDA), a handheld device having wireless connection capability, or other processing device connected to a wireless modem or similar mechanism facilitating wireless communication with a processing device.

In one or more exemplary embodiments, the functions described can be implemented in hardware, software, firmware, middleware, microcode, or any suitable combination thereof. If implemented in software, the functions can be stored on or transmitted over as one or more instructions or code on a computer-readable medium. Computer-readable media includes both computer storage media and communication media including any medium that facilitates transfer of a computer program from one place to another. A storage media may be any physical media that can be accessed by a computer. By way of example, and not limitation, such computer storage media can comprise RAM, ROM, EEPROM, CD-ROM or other optical disk storage, magnetic disk storage or other magnetic storage devices, smart cards, and flash memory devices (e.g., card, stick, key drive . . . ), or any other medium that can be used to carry or store desired program code in the form of instructions or data structures and that can be accessed by a computer. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

For a hardware implementation, the processing units' various illustrative logics, logical blocks, modules, and circuits described in connection with the aspects disclosed herein can be implemented or performed within one or more ASICs, DSPs, DSPDs, PLDs, FPGAs, discrete gate or transistor logic, discrete hardware components, general purpose processors, controllers, micro-controllers, microprocessors, other electronic units designed to perform the functions described herein, or a combination thereof. A general-purpose processor can be a microprocessor, but, in the alternative, the processor can be any conventional processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other suitable configuration. Additionally, at least one processor can comprise one or more modules operable to perform one or more of the steps and/or actions described herein.

Moreover, various aspects or features described herein can be implemented as a method, apparatus, or article of manufacture using standard programming and/or engineering techniques. Further, the steps and/or actions of a method or algorithm described in connection with the aspects disclosed herein can be embodied directly in hardware, in a software module executed by a processor, or in a combination of the two. Additionally, in some aspects, the steps or actions of a method or algorithm can reside as at least one or any combination or set of codes or instructions on a machine-readable medium, or computer-readable medium, which can be incorporated into a computer program product. The term "article of manufacture" as used herein is intended to encompass a computer program accessible from any suitable computer-readable device or media.

Additionally, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Furthermore, as used herein, the terms to "infer" or "inference" refer generally to the process of reasoning about or inferring states of the system, environment, or user from a set of observations as captured via events, or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events, or data. Such inference results in the construction of new events or actions from a set of observed events and/or stored event data, whether or not the events are correlated in close temporal proximity, and whether the events and data come from one or several event and data sources.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "has" or "having" are used in either the detailed description or the claims, such terms are intended to be inclusive in a manner similar to the term "comprising" as "comprising" is interpreted when employed as a transitional word in a claim.

What is claimed is:

1. A method of wireless communication, comprising:
generating a sequence for a user equipment-specific (UE-specific) reference signal, the UE-specific reference signal being used for downlink channel estimates by a specific UE;
generating a sequence for a cell-specific reference signal;
mapping the UE-specific reference signal sequence to first resources of a wireless channel by providing a first shift in frequency based on an integer value determined using a first function of a cell identifier (ID), the first function being a product of the cell ID and a modulus operation by a first integer;
mapping the cell-specific reference signal sequence to second resources of the wireless channel by providing a second shift in frequency based on an integer value determined using a second function of the cell ID, the second function being a product of the cell ID and a modulus operation by a second integer,
the first function being different from the second function, and
the first shift in frequency being different from the second shift in frequency; and
transmitting the UE-specific reference signal and the cell-specific reference signal for downlink channel estimation.

2. The method of claim 1, further comprising mapping the UE-specific reference signal sequence to the first resources of a resource block allocated to a single antenna port.

3. The method of claim 1, further comprising mapping the UE-specific reference signal sequence to a resource block allocated to a particular antenna port.

4. The method of claim 1, further comprising distributing the UE-specific reference signal or the cell-specific reference signal among a set of multiple transmit antennas to facilitate downlink multiple antenna transmissions for the UE-specific reference signal or cell-specific reference signal.

5. The method of claim 4, wherein the cell ID is a virtual cell ID.

6. The method of claim 5, wherein:
the virtual cell ID is common among the set of antennas, and the set of antennas are located at one or more base stations.

7. The method of claim 6, wherein the virtual cell ID generates a matching resource shift that is a substantially identical shift in frequency at each respective antenna.

8. The method of claim 1, in which the first resources are orthogonal to the second resources.

9. The method of claim 1, further comprising:
determining a sequence for a multicast-broadcast single-frequency network (MBSFN) reference signal.

10. An apparatus for wireless communications, comprising:
a memory unit; and
at least one processor coupled to the memory unit, the at least one processer being configured:
to generate a sequence for a user equipment-specific (UE-specific) reference signal, the UE-specific reference signal being used for downlink channel estimates by a specific UE;
to generate a sequence for a cell-specific reference signal;
to map the UE-specific reference signal sequence to first resources of a wireless channel by providing a first shift in frequency based on an integer value determined using a first function of a cell identifier (ID), the first function being a product of the cell ID and a modulus operation by a first integer;
to map the cell-specific reference signal sequence to second resources of the wireless channel by providing a second shift in frequency based on an integer value determined using a second function of the cell ID, the second function being a product of the cell ID and a modulus operation by a second integer,
the first function being different from the second function, and
the first shift in frequency being different from the second shift in frequency; and
to transmit the UE-specific reference signal and the cell-specific reference signal for downlink channel estimation.

11. The apparatus of claim 10, wherein the at least one processor is further configured to select a resource block of the wireless channel for allocation of the UE-specific reference signal sequence.

12. The apparatus of claim 11, wherein the at least one processor is further configured to select the resource block based on an antenna port used by the UE-specific reference signal.

13. The apparatus of claim 10, wherein the at least one processor is further configured to provide a copy of the UE-specific reference signal or cell-specific reference signal to respective antennas of a multi-antenna communication arrangement.

14. The apparatus of claim 13, wherein:
the cell ID is a virtual ID common to each antenna of the multi-antenna communication arrangement, and respective antennas of the arrangement are located at one or more base stations.

15. The apparatus of claim 14, wherein:
the virtual ID enables reference signal symbols to be allocated to channel resource elements with a common resource shift among the respective antennas, and
noise is randomized between transmissions of the multi-antenna communication arrangement and other transmissions of the arrangement or respective antennas thereof.

16. The apparatus of claim 10, in which the first resources are orthogonal to the second resources.

17. An apparatus for wireless communications, comprising:
means for generating a sequence for a user equipment-specific (UE-specific) reference signal, the UE-specific reference signal being used for downlink channel estimates by a specific UE;
means for generating a sequence for a cell-specific reference signal;
means for mapping the UE-specific reference signal sequence to first resources of a wireless channel by providing a first shift in frequency based on an integer value determined using a first function of a cell identifier (ID), the first function being a product of the cell ID and a modulus operation by a first integer;

means for mapping the cell-specific reference signal sequence to second resources of the wireless channel by providing a second shift in frequency based on an integer value determined using a second function of the cell ID, the second function being a product of the cell ID and a modulus operation by a second integer, the first function being different from the second function, and the first shift in frequency being different from the second shift in frequency; and means for transmitting the UE-specific reference signal and the cell-specific reference signal for downlink channel estimation.

18. The apparatus of claim 17, further including:

means for distributing a copy of the UE-specific reference signal sequence or of the cell-specific reference signal sequence to respective antennas of a multi-antenna arrangement; and means for establishing the cell ID as a virtual ID, the virtual ID being common to each antenna of the multi-antenna arrangement.

19. A non-transitory computer-readable medium having program code recorded thereon, the program code comprising:

program code to generate a sequence for a user equipment-specific (UE-specific) reference signal, the UE-specific reference signal being used for downlink channel estimates by a specific UE;

program code to generate a sequence for a cell-specific reference signal;

program code to map the UE-specific reference signal sequence to first resources of a wireless channel by providing a first shift in frequency based on an integer value determined using a first function of a cell identifier (ID), the first function being a product of the cell ID and a modulus operation by a first integer;

program code to map the cell-specific reference signal sequence to second resources of the wireless channel by providing a second shift in frequency based on an integer value determined using a second function of the cell ID, the second function being a product of the cell ID and a modulus operation by a second integer, the first function being different from the second function, and the first shift in frequency being different from the second shift in frequency; and program code to transmit the UE-specific reference signal and the cell-specific reference signal for downlink channel estimation.

20. The non-transitory computer-readable medium of claim 19, further comprising:

program code to distribute a copy of the UE-specific reference signal sequence or of the cell-specific reference signal sequence to respective antennas of a multi-antenna arrangement; and program code to establish the cell ID as a virtual ID, the virtual ID being common to each antenna of the multi-antenna arrangement.

21. The non-transitory computer-readable medium of claim 19, in which the first resources are orthogonal to the second resources.

22. A method for wireless communications, comprising:

analyzing symbols of a received wireless signal;

identifying a user equipment-specific (UE-specific) reference signal and a cell-specific reference signal, the UE-specific reference signal and the cell-specific reference being used by a UE to perform downlink channel estimates;

processing the UE-specific reference signal according to a first shift in frequency based on an integer value determined using a first function of a cell identifier (ID) for a cell associated with the received wireless signal, the first function being a product of a modulus operation by a first integer and the cell (ID); and processing the cell-specific reference signal according to a second shift in frequency based on an integer value determined using a second function of the cell ID, the second function being a product of the cell ID and a modulus operation by a second integer, the first function being different from the second function, and the first shift in frequency being different from the second shift in frequency.

23. The method of claim 22, further comprising identifying information associated with the UE-specific reference signal and the cell-specific reference signal on a non-physical signaling layer.

24. An apparatus for wireless communications, comprising:

a memory unit; and at least one processor coupled to the memory unit, the at least one processor being configured:

to analyze symbols of a received wireless signal;

to identify a user equipment-specific (UE-specific) reference signal and a cell-specific reference signal, the UE-specific reference signal and the cell-specific reference signal being used by a UE to perform downlink channel estimates;

to process the UE-specific reference signal according to a first shift in frequency based on an integer value determined using a first function of a cell identifier (ID) for a cell associated with the received wireless signal, the first function being a product of a modulus operation by a first integer and the cell (ID); and to process the cell-specific reference signal according to a second shift in frequency based on an integer value determined using a second function of the cell ID, the second function being a product of the cell ID and a modulus operation by a second integer, the first function being different from the second function, and the first shift in frequency being different from the second shift in frequency.

25. The apparatus of claim 24, wherein the at least one processor is further configured to identify information associated with the UE-specific reference signal and the cell-specific reference signal on a non-physical signaling layer.

26. An apparatus for wireless communications, comprising:

means for analyzing symbols of a received wireless signal;

means for identifying a user equipment-specific (UE-specific) reference signal and a cell-specific reference signal, the UE-specific reference signal and the cell-specific reference signal being used by a UE to perform downlink channel estimates;

means for processing the UE-specific reference signal according to a first shift in frequency based on an integer value determined using a first function of a cell identifier (ID) for a cell associated with the received wireless signal, the first function being a product of a modulus operation by a first integer and the cell (ID); and means for processing the cell-specific reference signal according to a second shift in frequency based on an integer value determined using a second function of the cell ID, the second function being a product of the cell ID and a modulus operation by a second integer, the first function being different from the second function, and the first shift in frequency being different from the second shift in frequency.

27. A non-transitory computer-readable medium having program code recorded thereon, the program code comprising:

program code to analyze symbols of a received wireless signal;

program code to identify a user equipment-specific (UE-specific) reference signal and a cell-specific reference signal, the UE-specific reference signal and the cell-specific reference signal being used by a UE to perform downlink channel estimates;

program code to process the UE-specific reference signal according to a first shift in frequency based on an integer value determined using a first function of a cell identifier (ID) for a cell associated with the received wireless signal, the first function being a product of a modulus operation by a first integer and the cell (ID); and program code to process the cell-specific reference signal according to a second shift in frequency based on an integer value determined using a second function of the cell ID, the second function being a product of the cell ID and a modulus operation by a second integer, the first function being different from the second function, and the first shift in frequency being different from the second shift in frequency.

* * * * *